United States Patent [19]
Maruta et al.

[11] Patent Number: 5,523,943
[45] Date of Patent: Jun. 4, 1996

[54] DATA PROCESSING DEVICE

[75] Inventors: Tomoe Maruta; Takayuki Okutsu; Hiroshi Hayashi; Hisayoshi Mori, all of Kanagawa, Japan

[73] Assignee: Fuji Xerox Co., Ltd., Tokyo, Japan

[21] Appl. No.: 483,172

[22] Filed: Jun. 7, 1995

Related U.S. Application Data

[62] Division of Ser. No. 384,354, Feb. 2, 1995, which is a continuation of Ser. No. 63,564, May 19, 1993, abandoned.

[30] Foreign Application Priority Data

May 20, 1992 [JP] Japan ................................ 4-127392

[51] Int. Cl.$^6$ ..................................... G06F 17/28
[52] U.S. Cl. .................. 364/419.04; 364/419.14
[58] Field of Search .................. 364/419.14, 419.04, 364/200 MS File, 900 MS File, 419.02

[56] References Cited

U.S. PATENT DOCUMENTS

| | | | |
|---|---|---|---|
| 4,460,973 | 7/1984 | Tanimoto et al. | 364/900 |
| 4,468,754 | 8/1984 | Asada et al. | 364/900 |
| 4,630,235 | 12/1986 | Hashimoto et al. | 364/900 |
| 4,648,070 | 3/1987 | Washizuka | 364/900 |
| 4,814,988 | 3/1989 | Shiotani et al. | 364/419 |
| 4,829,423 | 5/1989 | Tennant et al. | 364/200 |
| 4,962,452 | 10/1990 | Nogami et al. | 364/419 |
| 4,977,503 | 12/1990 | Rudnick et al. | 364/410 |

*Primary Examiner*—Gail O. Hayes
*Assistant Examiner*—Frantzy Poinvil
*Attorney, Agent, or Firm*—Finnegan, Henderson, Farabow, Garrett & Dunner

[57] ABSTRACT

Disclosed is a data processing device, such as a handy translating device which translates specific phrases into corresponding phrases in another language system or, such as a retrieving device which retrieves specific phrases containing words. The data processing device includes a phrase storing unit for storing phrases each consisting of one or more words in a state that label data relating to the phrase is attached to the phrase, a retrieval word input unit for inputting a retrieval word, a label data retrieving unit for retrieving a phrase with the same label data as the retrieval word from among the phrases in the phrase storing unit, a display unit, and a display control unit for controlling an operation of the display unit for displaying the phrase retrieved by the label data retrieving unit.

1 Claim, 18 Drawing Sheets

| ADDRESS | PHRASE | ADDRESS | PHRASE |
|---------|--------|---------|--------|
| ADX +"J" | 普通列車 | ADX +"E" | local train |
| ADY +"J" | さようなら | ADY +"E" | good-bye |
| ⋮ | ⋮ | ⋮ | ⋮ |

61  62  61

| ADDRESS | CODE DATA |
|---|---|
| 10 ---- 000 | ｜チェックイン｜をお願いします |
| 10 ---- 001 | 日本円で払えますか＃｜支払う｜ |
| 10 ---- 002 | 朝食は何時からですか |
| ⋮ | ⋮ |
| 10 ---- 050 | ｜トラベラーズチェック｜で支払えますか＃｜支払う｜ |
| 10 ---- 051 | クレジットカードは使えますか＃｜支払う｜、｜デポジット｜、｜電話｜ |
| ⋮ | ⋮ |

FIG. 11

| あ | か | さ | た | な | は | ま | や | ら | わ |
|---|---|---|---|---|---|---|---|---|---|
| い | き | し | ち | に | ひ | み |   | り | ↓ |

FIG. 12

| い | き | し | ち | に | ひ | み |   | り |   |
|---|---|---|---|---|---|---|---|---|---|
| う | く | す | つ | ぬ | ふ | む |   | る | ↓ |

I'd like a pillow.

DATA PROCESSING DEVICE

This is a divisional of application Ser. No. 08/384,354, filed Feb. 2, 1995, which is a continuation of Ser. No. 08/063,564, filed May 19, 1993, now abandoned.

BACKGROUND OF THE INVENTION

1. Field of the Invention

The present invention relates to a data processing device, such as a handy translating device, which translates specific phrases into corresponding phrases in another language system or, such as a retrieving device, which retrieves specific phrases containing words.

2. Discussion of the Related Art

Many books containing collections of conversation expressions in various situations of overseas travels, business, and the like have been published in Japan. Further, portable data processing devices as the electronic version of this type of books have also been used widely. Electronic pocketbooks are typically known for the data processing device. In the electronic pocketbooks, desired conversation examples are selected by operating keys, and displayed on a display window.

An example of the conventional data processing device is illustrated in FIG. 25. In the data processing device designated by reference numeral 11, a display window 12 using a liquid crystal display (LCD), for example, is located in the upper portion of the main body of the data processing device. Panels $13_1$ to $13_N$ indicative of several scenes that will be experienced in the travel, and a select key 14 are located under the display window 12.

In operation, when an operator presses the first panel $13_1$ for basic English conversation phrases, for example, the first phrase of those basic phrases in Japanese is displayed in the display window 12. When he presses the select key 14 once, the display window 12 displays the English phrase corresponding to the Japanese phrase already displayed. Next, he presses the select key 14 once again. Then, the display window 12 displays the next Japanese phrase. Further, when he presses the select key 14, the corresponding English phrase is displayed. In this way, every time the operator presses the select key 14, the Japanese phrases and the English phrases are alternately displayed.

To select a desired phrase for conversation, the scene containing the desired phrase is selected by designating the corresponding panel of those panels $13_1$ to $13_N$. Accordingly, the operator more quickly reaches his intended phrase when comparing with the data processing device of the type in which various types of conversation phrases not classified, are stored in block. Some type of data processing device includes two types of select keys, a forward key and a backward key. In this type of data processing device, the phrase which has been displayed before can be displayed again.

Another type of data processing device includes two select keys, one for Japanese and the other for English. When the Japanese key is continuously pressed, the Japanese phrases appear in successive manner. Accordingly, the operator first finds a desired Japanese phrase by using the Japanese select key, and then finds the corresponding English phrase by the English key.

FIG. 26 shows another conventional data processing device.

The data processing device includes a narrow display window 22 constructed with the LCD, which is located in the upper portion of the main body. Alphabet keys and other keys are arrayed under the display window 22. Those keys are generally designated by reference numeral 23. The data processing device has the function to retrieve desired data. In operation, the operator enters a word by operating the related keys 23. Then, the data processing device sequentially checks many phrases stored in the device one by one to find an phrase containing the same word as the entered one. The phrase containing the entered word, when found, is displayed in the display window 22.

The data processing device of FIG. 25 searches a desired conversation phrase every scene. Accordingly, the operator reaches the desired phrase more quickly than in the data processing device of FIG. 26. When as the result of reduction of the memory cost, a memory of large memory capacity is used for the memory for storing the conversation phrases, the number of phrases stored every scene is increased. Accordingly, the select key 14 must be operated many times till a desired phrase is reached.

The scenes into which the conversation phrases are classified are selected in the stage of device design. The scenes selected by designers are inconvenient to some users.

In the case of the FIG. 26 device, the user can enter the spellings of words since many keys are used. Accordingly, the FIG. 26 device can retrieve the intended phrase using a keyword, which is a finer category than the categories, such as "Eating out" and "Sight-seeing" in the FIG. 25 device. However, the FIG. 26 device has the following disadvantages.

1) The array of the keys 23 occupies a large area on the main body, since the number of keys 23 is great. Accordingly, the area for the display window 22, viz., the display area of the retrieved phrase, is correspondingly reduced. To secure a sufficient display area, the device size and hence its cost are increased. Users poor in key operation skill frequently mistake the key operation, and take much time to search the desired phrase.

2) Complete coincidence of the entered keyword with the word in a desired phrase is essential to the retrieval of the phrase. Accordingly, to retrieve a phrase containing alcoholic drink, for example, many related words, such as "liquor", "sake", and "alcoholic drink", must be entered. Further, a phrase containing a word which does not literally denote, for example, "drank" in "They drank the night away", cannot be retrieved by using the keyword "drink". In retrieving a desired phrase containing an inflective word (e.g., drink→drank in the above case), the data processing device cannot predict an actual form of the word in the phrase.

SUMMARY OF THE INVENTION

The present invention has been made in view of the above circumstances and has a first object to provide a data processing device which can retrieve a desired phrase even if the data processing device is of the type in which a number of phrases are stored in a state that those phrases are categorized every scene.

A second object of the present invention is to provide a data processing device which can retrieve a desired phrase even if the keyword is deflective or homonymous.

A third object of the present invention is to provide a data processing device which can display a larger number of phrases than a preset number of phrases.

A fourth object of the present invention is to provide a data processing device which allows an operator to confirm the pronunciation of the retrieved phrase, for example, or reads the retrieved one for the operator.

A fifth object of the invention is to provide a data processing device which requires a less number of keys for retrieval.

The invention provides a data processing device including phrase storing means for storing phrases each including one or more words in a state that label data relating to the phrase is attached to the phrase, retrieval word input means for inputting a retrieval word, label data retrieving means for retrieving a phrase with the same label data as the retrieval word from among the phrases in the phrase storing means, display means, and display control means for controlling an operation of the display means for displaying the phrase retrieved by the label data retrieving means.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

FIG. 11 is a diagram showing an initial pattern of first letters of keyword, which are arranged in the order of the Japanese syllabary;

FIG. 12 is a diagram showing a pattern of first letters after the down cursor key is repeatedly pressed twice;

FIG. 13 is a diagram showing an example of keyword displayed in the display window;

FIGS. 14(a) to 14(d) are diagrams useful in explaining the word bank functions;

DETAILED DESCRIPTION OF THE PREFERRED EMBODIMENTS

The preferred embodiments of the present invention will be described with reference to the accompanying drawings, particularly FIGS. 1 to 24.

Figure 2:
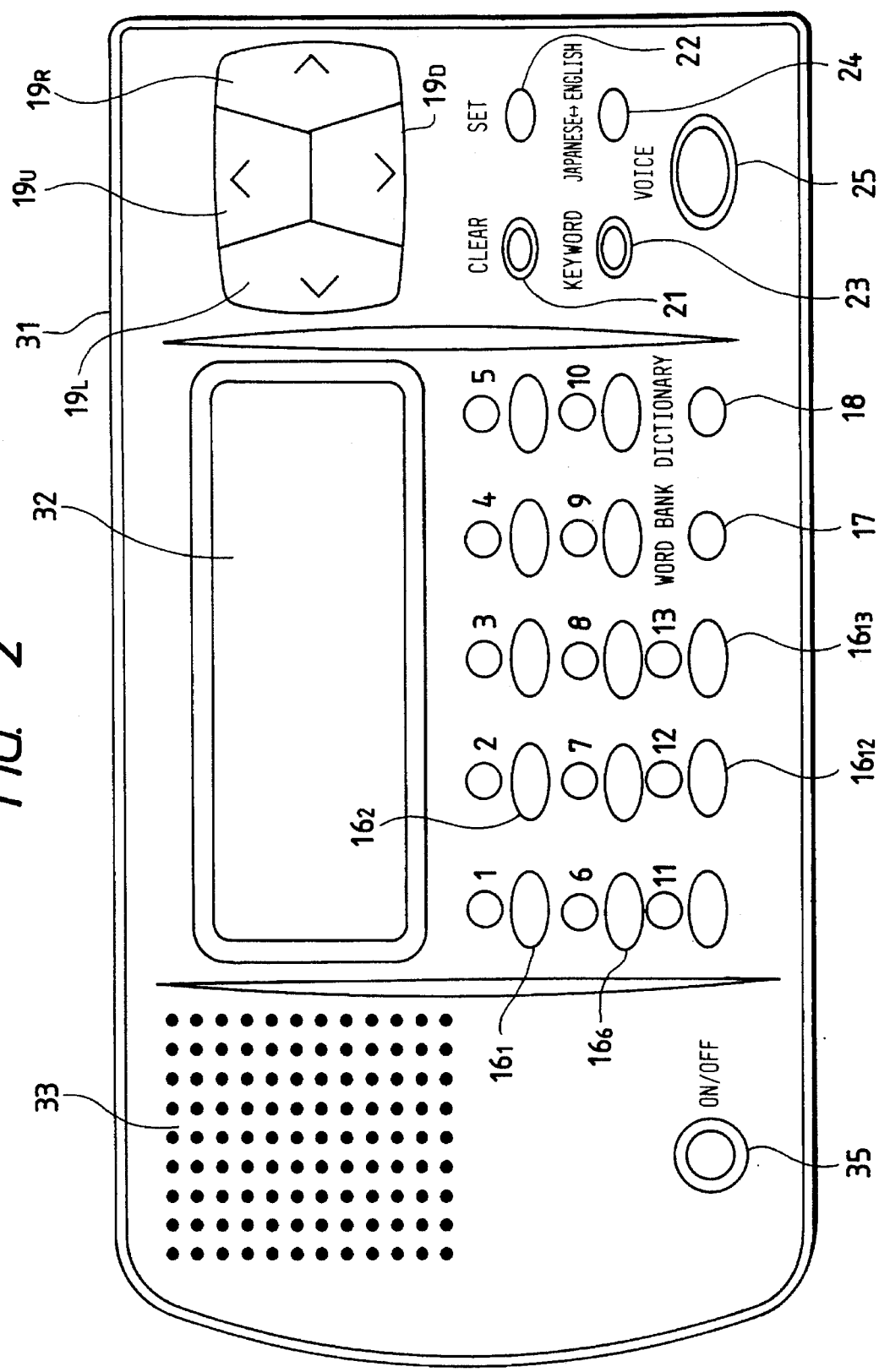
FIG. 2 is a plan view showing the data processing device of FIG. 1.

FIG. 2 is a plan view showing a data processing device according to a first embodiment of the present invention.

The data processing device designated by reference numeral 31, which is useful in overseas travels for business, sight-seeing, and the like, stores a number of pairs of Japanese phrases and corresponding English phrases, and includes a display window 32 constructed with a liquid crystal display for displaying the phrases. When an English phrase is displayed, the data processing device speaks the phrase in English by a speaker 33.

The data processing device 31 includes various keys or buttons for attaining such functions.

A power switch 35 is located under the speaker 33 (as viewed in the drawing). To turn on the data processing device, the power switch 35 is pressed, and to turn off the same, it is pressed again. Thirteen scene buttons $16_1$ to $16_{13}$, a word bank button 17, and a dictionary button 18 are arrayed under the display window 32. Four cursor keys $19_U$, $19_D$, $19_R$ and $19_L$ are located on the right side of the display window 32. A clear button 21, a set button 22, a keyword button 23, a Japanese-English button 24, and a voice button 25 are arrayed under the cursor keys $19_U$, $19_D$, $19_R$ and $19_L$.

The thirteen scene buttons $16_1$ to $16_{13}$ are allotted to scenes in travels as shown in Table 1.

TABLE 1

| Button No. | Scene |
| --- | --- |
| 1 | Basic expression |
| 2 | Arrival |
| 3 | Lodging |
| 4 | Eating out |
| 5 | Movement |
| 6 | Sight-seeing |
| 7 | Entertainment |
| 8 | Shopping |
| 9 | Trouble |
| 10 | Telephone, Post office |
| 11 | Communication |
| 12 | Business conversation |
| 13 | Returning home |

The word bank button 17 is used for listing up words relating to the contents of a topic displayed in the display window 32. The term "topic" has the same meaning as the title, and is in a level lower than the scene in the layer structure. The dictionary button 18 is used when referring to "Japanese-to-English" or "English-to-Japanese" dictionary. The four cursor keys $19_U$, $19_D$, $19_R$ and $19_L$ are used for scrolling the screen in the up, down, right, and left directions. The clear button 21 is used for clearing the contents of entered data. The set button 22 is used for definitely setting desired display contents.

The keyword button 23 is used for searching a keyword. The Japanese-English key 24 is operated for switching the display screen from the English version of the scene, topic title, phrase and word bank to the Japanese one, and vice versa. The voice button 25 is operated for causing the device to speak the scene, the title of topic or phrase in English. In this instance of the embodiment, the device cannot speak it in Japanese.

An electrical circuit arrangement of the data processing device described above is illustrated in block form in FIG. 1. The data processing device 31 contains a CPU (central processing unit) 41 for various controls. The CPU 41 is connected through a bus 42, e.g., a data bus, to a ROM (read only memory) 43, a work memory 44, a character generator 45, a speech IC 46, a display driver 47, and a button input circuit 48.

The ROM 43 has a large memory capacity (16 Mega bits in this instance) for storing programs of various controls in the data processing device 31, and a number of phrases. The work memory 44 is a random access memory for temporarily storing data necessary for executing programs. The character generator 45 generates Japanese and English character patterns to be displayed by the display window 32. The button input circuit 48 receives data entered from a keyboard unit 51 containing the scene buttons $16_1$ to $16_{13}$, the word bank button 17, and the like.

The speech IC (integrated circuit) 46 produces a voice signal on the basis of voice data, which is stored in a part of the ROM 43, in connection with the stored scenes. The voice signal output from the speech IC 46 is amplified by an amplifier 53, and drives the speaker 33. Earphones or a headphone (not shown) may be used instead of the speaker 33. It is convenient when the speech of the phrases is confirmed in a bus or train.

Figure 3:
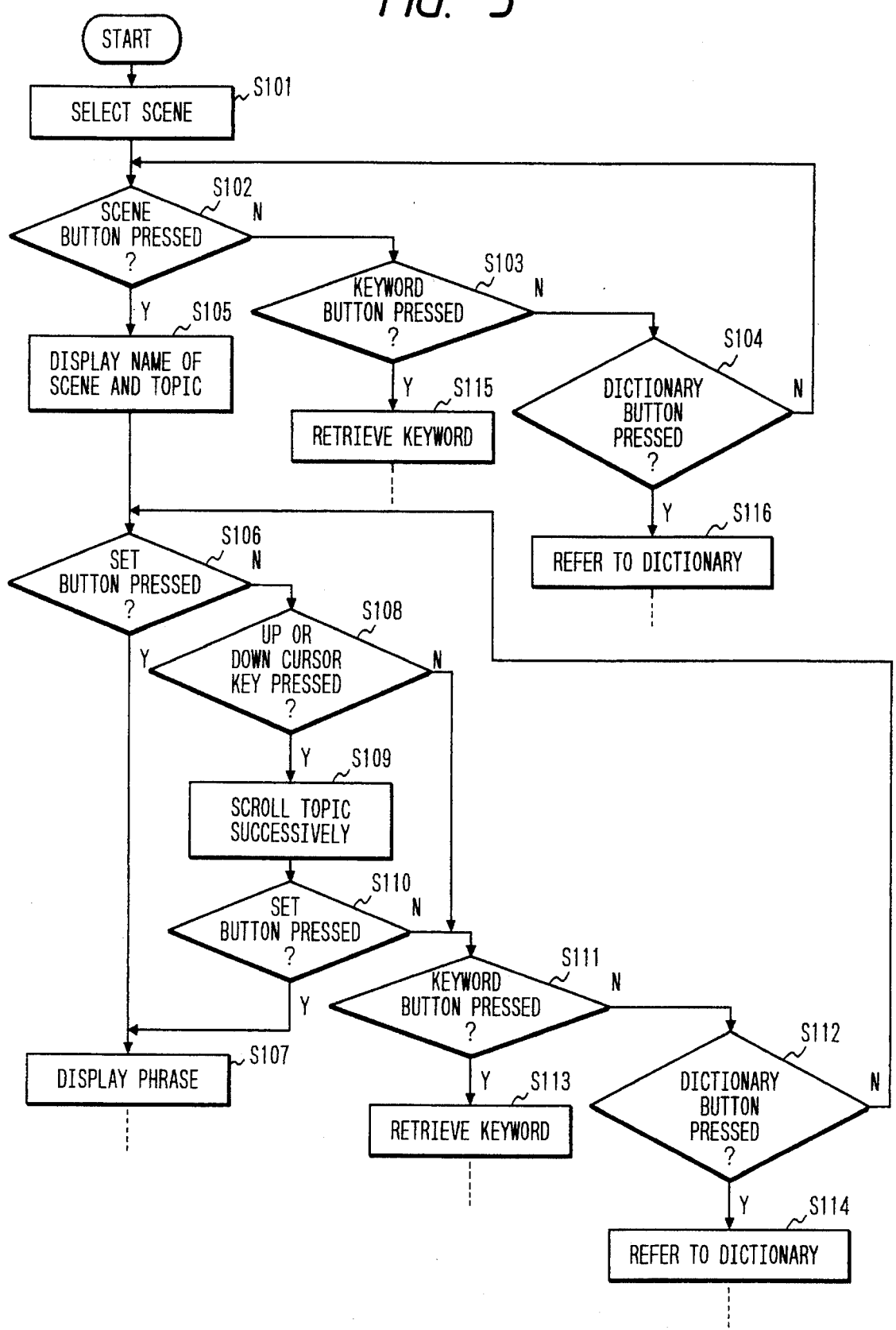
FIG. 3 is a flowchart showing the operation of the data processing device of FIG. 1.

The outline of sequences of operations of the data processing device is flowcharted in FIG. 3.

Figure 1:
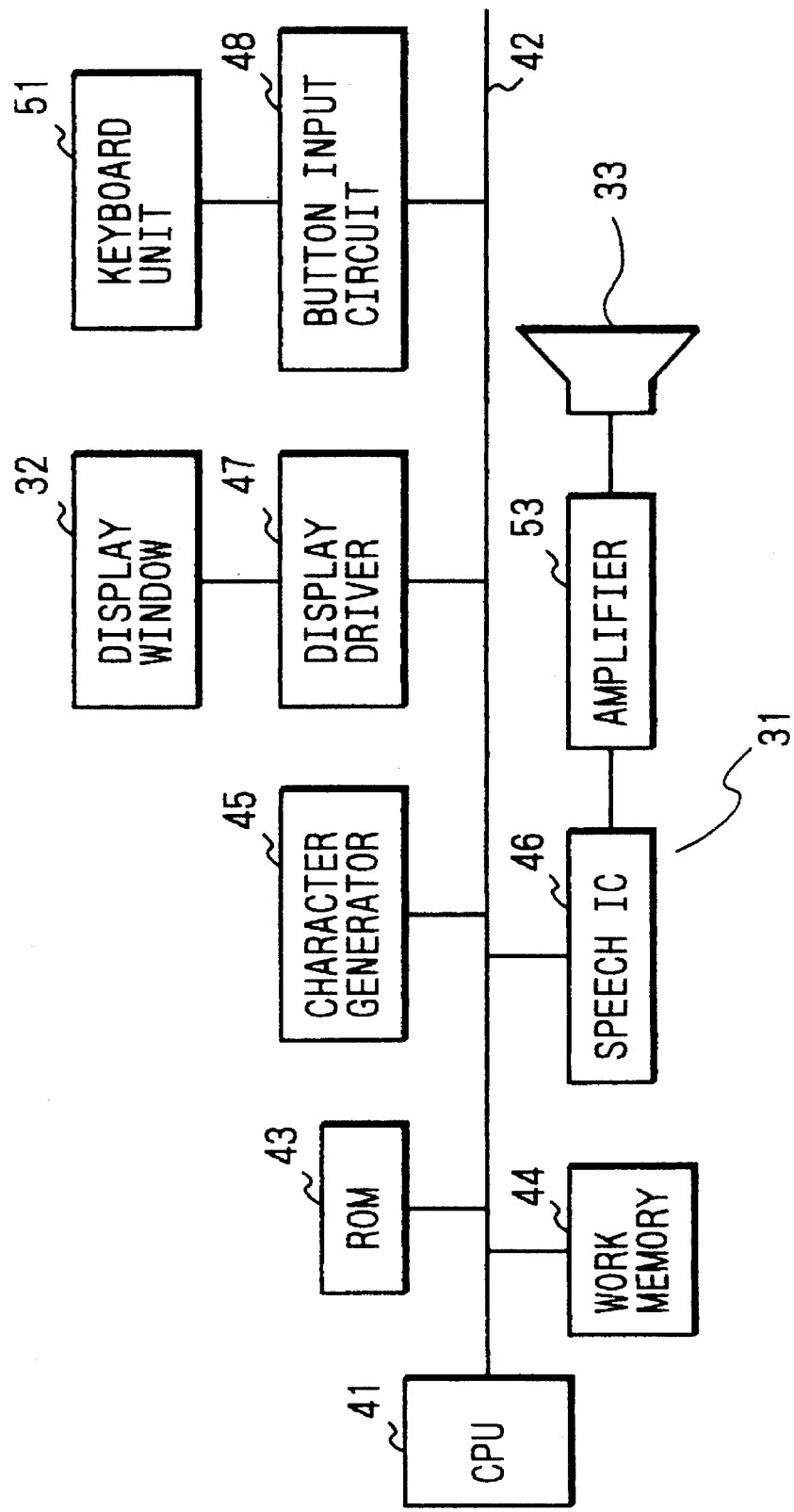
FIG. 1 is a block diagram showing a data processing device according to a first embodiment of the present invention.

In the data processing device 31 of FIG. 1, when the power switch 35 is pressed, the CPU 41 reads code data assigned to the Japanese phrase "シーンを選択して下z,5 " (shîn o sentakushitekudasai) which means "Please select a scene" from the ROM 43, writes the code data into a display memory (not shown) in the display driver 47, and causes the display window 32 to display "シーンを選択して下さい" in Japanese (step S101). In this state, the CPU 41 monitors the states of the scene buttons, the keyword button and the dictionary button to check if any of these buttons is depressed (steps S102, S103, and S104).

If an operator presses one of the scene buttons (step S102; Y), the name of the specified scene and the first topic are written into the display memory in an overwrite manner, and those are displayed in the display window 32 (step S105).

Let us consider a case where the operator has pressed the second scene button $16_2$ to select the scene "Arrival". In this case, "到着" (tôchaku) is displayed as the name of scene on the first line in the screen of the display window 32, and "入国審査" (nyukoku-shinsa) which means "inspection for entry" is displayed as the topic on the second line. At this time, if the set button 22 (FIG. 2) is pressed (step S106; Y), the phrase in the topic, e.g., "パスポートを見せて下さい" (pasupôto o misetekudasai) which means "May I see your passport?", is displayed in a similar way (step S107). The display operation of phrases will be described in detail hereinafter.

If the set button 22 is not pressed in step S106, and the up or down cursor key $19_U$ or $19_D$ is pressed (step S108; Y), the topics are scrolled one by one on the display window 32 (step S109). When a desired topic appears, the operator presses the set button 22 (step S110; Y), so that device starts to display the phrase in the topic (step S107). If the up or down cursor key $19_U$ or $19_D$ is not pressed (step S108; N), the keyword button 23 or the dictionary button 18 is pressed (step S111 or S112). As a result, the keyword is retrieved (step S113) or the dictionary is referred to (step S114).

When the keyword button 23 is pressed in step S103 or the dictionary button 18 is pressed in step S104, the keyword retrieval starts (step S115) or the operation of referring to dictionary starts (step S116).

Figure 4:
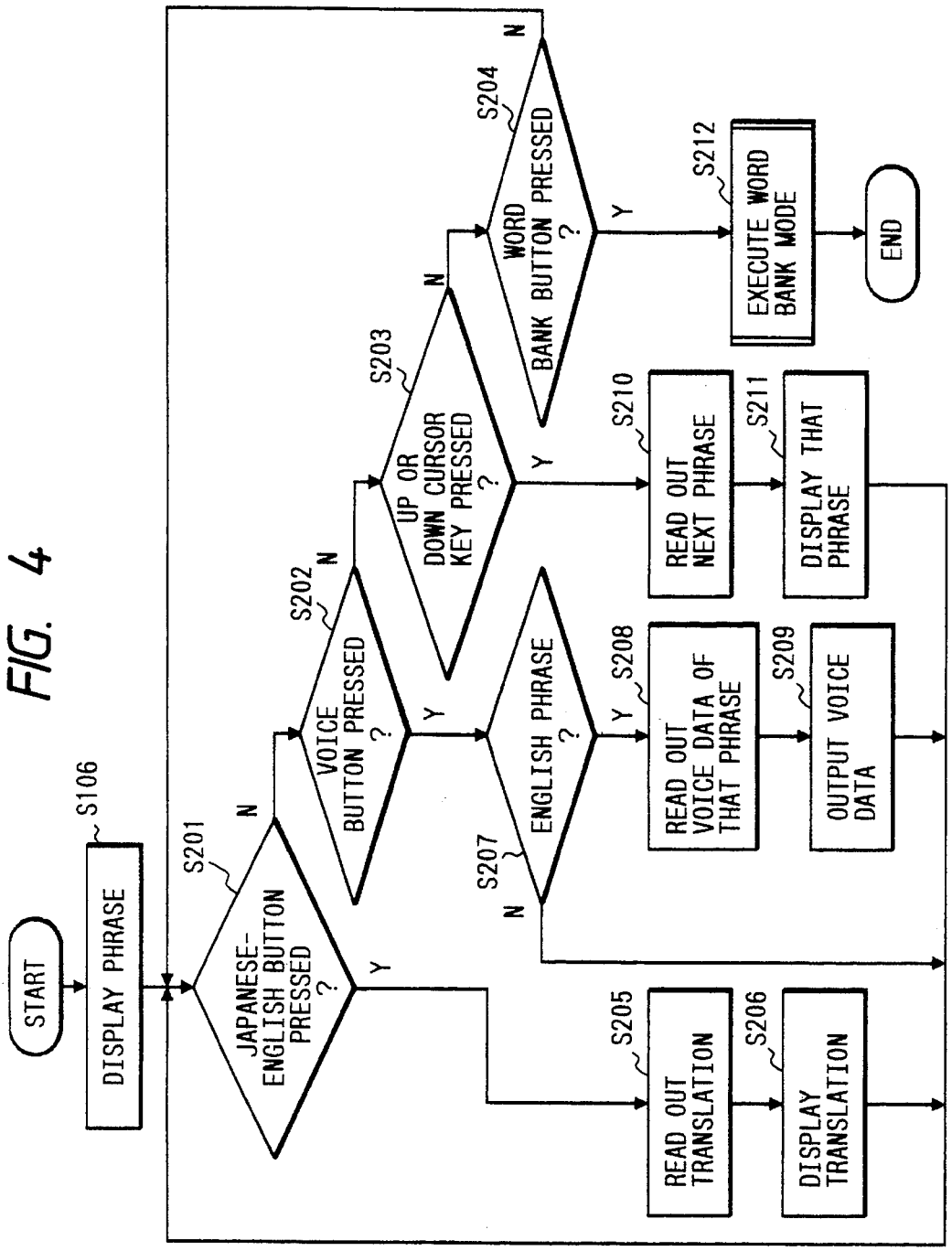
FIG. 4 is a flowchart showing the operation for phrase display.

FIG. 4 is a flowchart showing the operation for phrase display.

After the phrase is displayed in step S106 (FIG. 3), the CPU 41 (FIG. 1) monitors the states of the Japanese-English key 24, voice button 25, up or down cursor key $19_U$ or $19_D$, and word bank button 17 to check if any of these keys and buttons is depressed (steps S201 to S204).

When the Japanese-English key 24 is pressed (step 201; Y), the CPU reads the translation of the displayed phrase from the ROM 43 (step S205), drives the character generator 45 to generate characters of the translation, and writes them into the display memory, to display them on the screen of the display window (step S206). Thereafter, it returns to step S201.

Figures 5, 6:
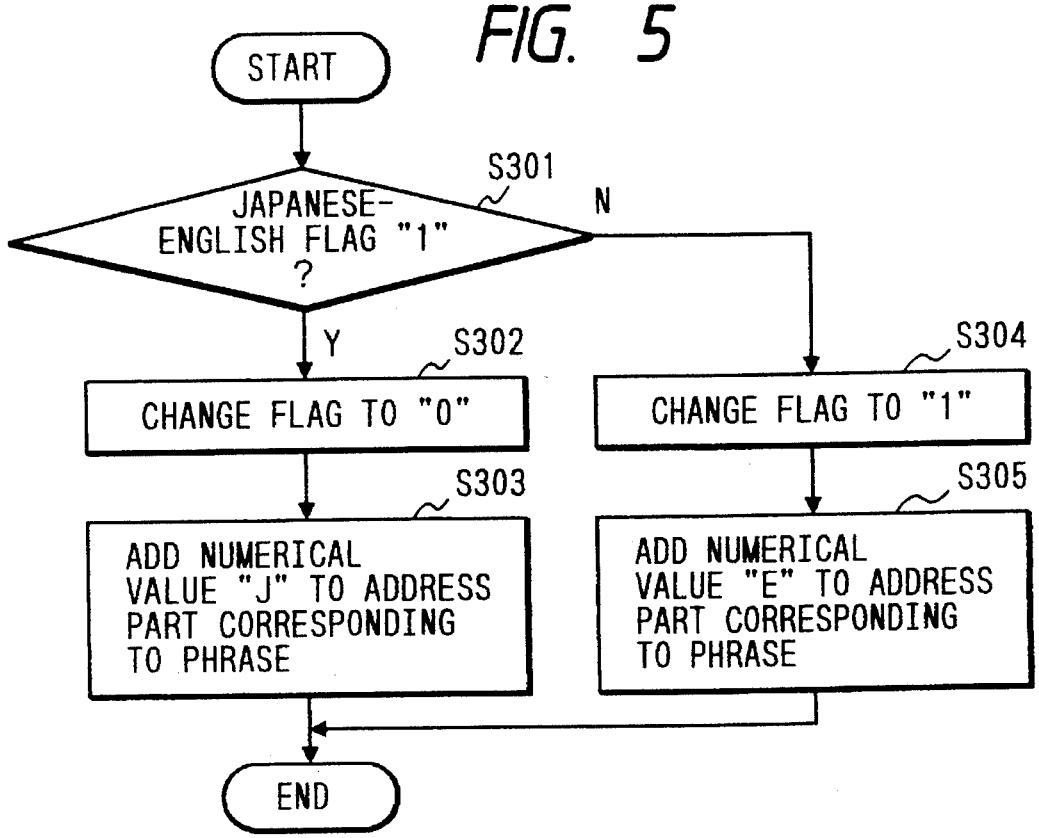
FIG. 5 is a flowchart showing the details of the control operation in step S205 in FIG. 4.
FIG. 6 is a table showing relationships between addresses and Japanese phrases and between addresses and English phrases.

FIG. 5 is a flowchart showing the details of the control operation in step S205 in FIG. 4.

When the Japanese-English key 24 is pressed in step S201 (FIG. 4), the CPU 41 (FIG. 1) reads a Japanese-English flag from a specific area in the work memory 44, and checks if it is set to "1" (English) (step S301). If it is "1" (Y), the CPU changes "1" of the flag to "0" (step S302). The CPU adds a predetermined numerical value "J" for Japanese display to the basic address part corresponding to the phrase under read (step S303). The CPU 41 reads the Japanese phrase from the added address of the ROM 43 (step S206 in FIG. 4).

If the Japanese-English flag is "0" (step S301; N), the CPU changes "0" of the flag to "1" (step S304). The CPU adds a predetermined numerical value "E" for English display to the basic address part corresponding to the phrase under read (step S305). The CPU 41 reads the English phrase from the added address of the ROM 43 (step S206 in FIG. 4).

FIG. 6 is a table showing relationships between addresses and Japanese phrases and between addresses and English phrases. The basic address parts corresponding to the phrases are denoted as $AD_x$ and $AD_y$. Code data representing the Japanese phrase "普通列車" (futsû-ressha) is assigned to the address $(AD_x+J)$ of the ROM 43. Code data representing the English phrase "local train" is assigned to the address $(AD_x+E)$ of the ROM 43. Similarly, code data representing the Japanese phrase "さようなら" (sayonara) is assigned to the address $(AD_y+J)$ of the ROM 43. Code data representing the English phrase "good-bye" is assigned to the address $(AD_y+E)$ of the ROM 43.

Returning to FIG. 4, when the voice button 25 is pressed (step S202; Y), the CPU checks if the Japanese-English flag indicates an English phrases (step S207). If the answer is yes (Y), the CPU reads voice data corresponding to the English phrase (step S208). The voice data is supplied to the speech IC 46, which causes the speaker 33 to speak the English phrase (step S209).

When the up or down cursor key $19_U$ or $19_D$ is pressed (step S203; Y), the next phrase is read out of the ROM 43 (step S210). The character generator 45 generates patterns of characters of the readout phrases. The character patterns are stored in the display memory, and then displayed (step S211). When the word bank button 17 is pressed (step S204; Y), the device is placed to a word bank mode (as will be described in detail later), and the CPU lists up words relating to the topic displayed in the display window 32 (step S212).

In the data processing device 31, when a keyword is selected by operating the keyword button 23 in step S103 or S111 (FIG. 3), the operator can retrieve a desired phrase by using the selected keyword. As already described, he selects a desired specific scene by operating the related scene button of those buttons $16_1$ to $16_{13}$. Alternatively, the same thing can be achieved by selecting a keyword relating to the desired phrase.

Figure 7:
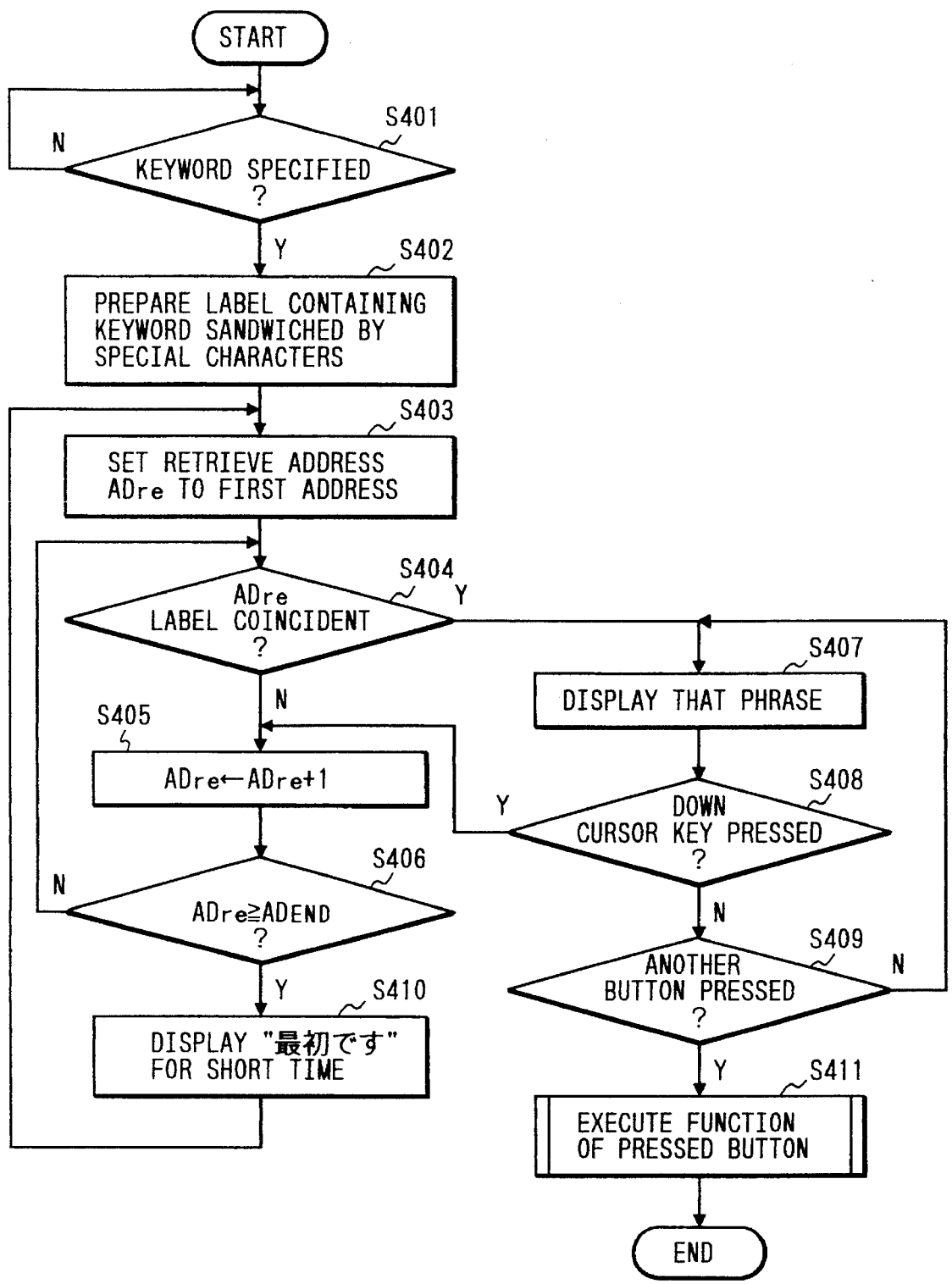
FIG. 7 is a flowchart showing the control flow for the retrieve by keyword.

FIG. 7 is a flowchart showing the control flow for the retrieve by keyword. The operator operates the data processing device 31 to definitely set a keyword to be retrieved (step S401; Y). This operation will be described in detail later. In a case where a keyword "支払う" (shiharau) which means "pay", for example, is selected through the operation, the CPU 41 attaches special characters to both sides of the code data for the keyword, thereby forming a label (step S402). In this instance of the embodiment, a pipe character "|" is used for the special characters.

Figures 8, 9:
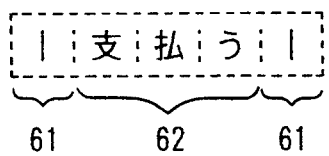
FIG. 8 is an explanatory diagram showing a label containing a keyword "支払う" (shiharau) sandwiched by pipe characters.
FIG. 9 is an explanatory diagram showing a part of a phrase memory.

FIG. 8 is an explanatory diagram showing a label containing a keyword "支払う" (shiharau) sandwiched by pipe characters. The pipe characters 61 are used for distinguishing a keyword 62 from other codes.

After preparing the label, the CPU sets an address $AD_{re}$ for phrase retrieval at the first address in the area of the ROM 43 where a number of phrases are stored (hereinafter, this memory area will be referred to as a phrase memory) (step S403). The label is compared with the label data attached to the phrase stored in the address (step S404).

FIG. 9 is an explanatory diagram showing a part of the phrase memory. As shown, code data is stored and assigned to addresses respectively. Some code data consist of only phrase, while some code data consist of phrase and label data. For example, in an address "10 . . . 000", a phrase "|チェックイン|をお願いします" (chekku-in o onegaishimasu) which means "I'd like to check in" is stored as code data. The part of the phrase, |チェックイン| (chekku-in), serves as both the nominal phrase and the label data. In an address "10 . . . 001", a phrase "日本円で支払えますか" (nihon-en de shiharaemasuka) which means "Can I pay by Japanese Yen?" is followed by a mark "#", and by label data "|支払う|" (shiharau) which means "pay". The mark "#" indicates that the code data subsequent to the mark is not transferred to the character generator 45, viz., that code data is not displayed in the display window 32.

The description of the retrieval by keyword will be further continued with reference to FIGS. 7 and 9.

It is assumed now that the label in the address $AD_{re}$ is coincident with the code data in the address "10 . . . 000" in the phrase memory. The label data "|チェックイン|" (chekku-in) is not coincident with the label "|支払う|" (shiharau) (step S404; N). In this case, the address $AD_{re}$ is counted up by one (step S405), and then the CPU checks if the address $AD_{re}$ exceeds the last address $AD_{END}$ in the phrase memory (step S406). If it does not yet reach the last address $AD_{END}$ (N), the CPU checks if the label in another address $AD_{re}$ coincides with the code data (step S404).

In this instance, the new address ADre is "10 . . . 001". In this address, as shown, the label "|支払う|" (shiharau) is used. Therefore, the labels are coincident with each other (Y). Then, the corresponding phrase (here, "日本円で支払えますか" (nihon-en de shiharaemasuka)) is displayed in the display window 32 (step S407).

In this state, the CPU 41 monitors states of key/button to check whether the down cursor key $19_D$ is pressed (step S408) or another button is pressed (step S409).

If the down cursor key $19_D$ is pressed (step S408; Y), the CPU returns to step S405 where the next phrase is retrieved by the same keyword. In the case of FIG. 9, "トラベラーズチェックで支払えますか" (toraberâzuchekku de shiharaemasuka) which means "Can I pay by traveler's check?" is displayed, which is in the address "10 . . . 050" of the address $AD_{re}$. Then, "クレジットカードは使えますか" (kurejitto-kâdo wa tsukaemasuka) is displayed, which is in the address "10 . . . 051" of the address $AD_{re}$. Any conjugation of "支払い" (shiharai) is not contained in the phrase, "クレジットカードは使えますか" (kurejitto-kâdo wa tsukaemasuka). However, since it is often used for the payment situation, the label data of "|支払う|" (shiharau) is added.

In this way, the label data in the phrase memory is successively retrieved by operating the down cursor key $19_D$. Finally, the address $AD_{re}$ reaches the final address $AD_{END}$ (step S406; Y). In this case, the CPU 41 displays a note "最初です" (saisho desu) which means "first data" for a short time in the display window 32 (step S410), and then sets the retrieval address $AD_{re}$ at the first address of the phrase memory (step S403). This is done to enable it to retrieve the contents of the phrase memory in a circulating manner.

When the up cursor key $19_U$, instead of the down cursor key $19_D$, is operated, the phrase preceding to the present one is retrieved. Sometimes, the Japanese-English key 24 is pressed or the voice button 25 is pressed in a state that the intended phrase is displayed. Such operations are illustrated en bloc in step S409. When the key or the button is pressed (step S409; Y), the function associated with the pressed key or button is executed as already described (step S411).

Now, the operation for definitely setting a keyword (step S401 in FIG. 7) will be described. In the data processing device 31, several keywords are prestored in the ROM 43.

Figure 10:
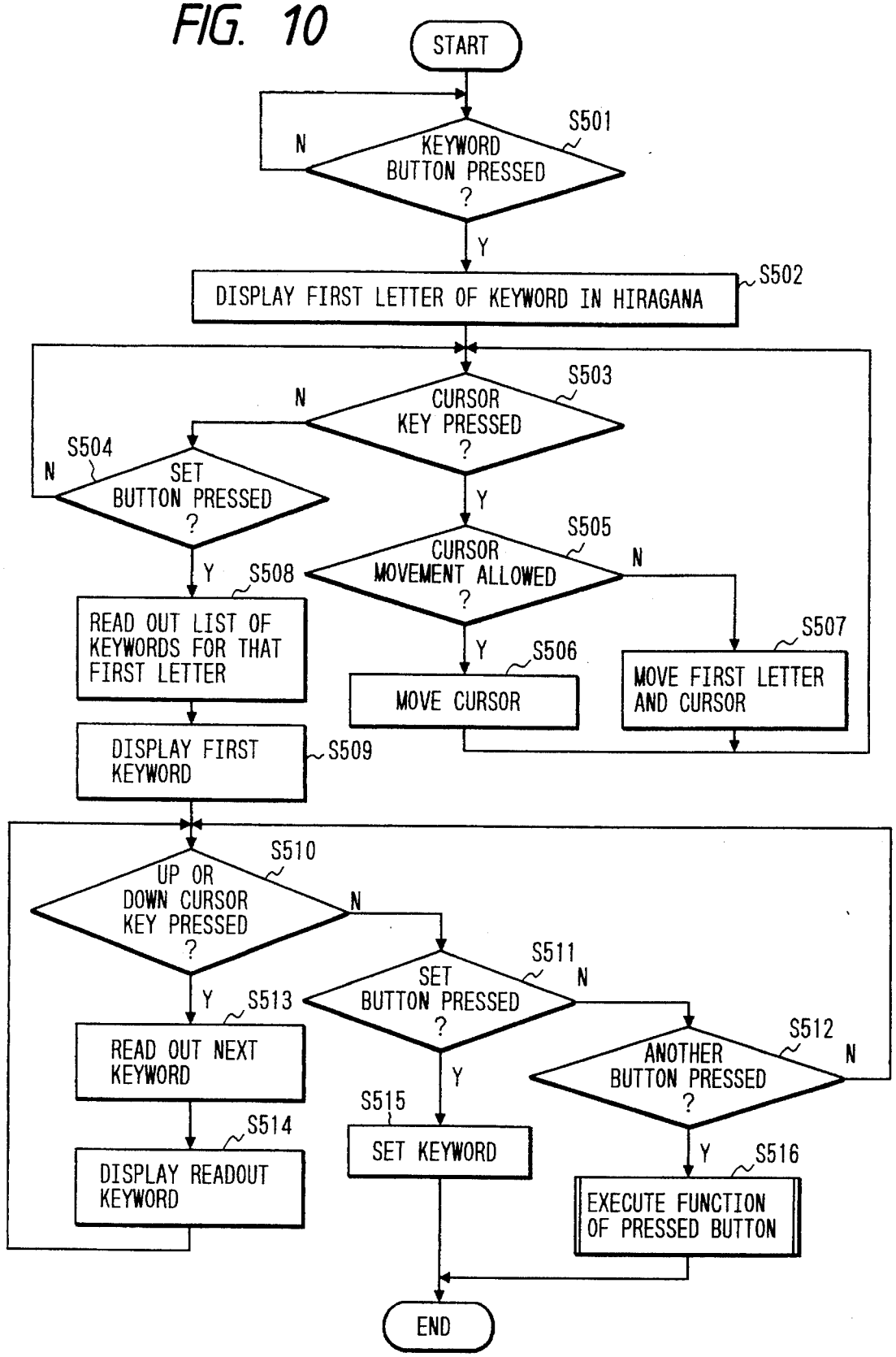
FIG. 10 is a flowchart showing the control flow for definitely setting a keyword.

FIG. 10 is a flowchart showing the control flow for definitely setting a keyword.

When the keyword button 23 is depressed (step S501; Y), the first letter of a keyword, which consists of a combination of Hiragana letters (phonetic symbols) of the Japanese syllabrary, is displayed (step S502).

FIG. 11 is a diagram showing an initial pattern of first letters of keyword, which are arranged in the order of the Japanese syllabary, Hiragana.

A part of the array of Hiragana letters is displayed in the display window 32, and a Japanese phonetic symbol "あ" (a) is marked with a cursor 71. An arrow 72 is displayed at the lower right corner of the screen of the display window 32.

The arrow 72 indicates that the array of Hiragana letters extends downward.

In this state of display, the CPU 41 monitors the states of the four cursor keys $19_U$, $19_D$, $19_R$ and $19_L$, and the set button 22 (steps S503 and S504). When any of the four cursor keys $19_U$, $19_D$, $19_R$ and $19_L$ (step S503; Y), the CPU checks if the cursor 71 goes out of the screen of the display window 32 (step S505). When the right cursor key $19_R$ is pressed, the cursor 71 is moved from the Hiragana "あ" (a) to another phonetic symbol "か" (ka) within the screen. Accordingly, in this case, only the cursor 71 is moved while the display of the array of Hiragana letters is as it is.

When the down cursor key $19_D$ is pressed in a state that the letter "い" (i) is marked with the cursor 71, it is impossible that only the cursor 71 is moved while the display of the array of Hiragana letters is as it is.

In this case (step S505; N), the first letter and the cursor 71 are moved together (step S507).

FIG. 12 is a diagram showing a pattern of first letters after the down cursor key is repeatedly pressed twice. As seen, the cursor 71 has been moved to point to the letter "う" (u). In this way, the operator sets the cursor 71 at the first letter of a desired keyword, and then presses the set button 22 (step S504; Y). In response to this, the CPU 41 reads a list of keyword, which corresponds to the first letter of the keyword, from the ROM 43 (step S508). The code data of the first keyword is transferred to the character generator 45, which in turn generates a pattern of characters. The character pattern is stored in the display memory (not shown) in the display driver 47. Then, the keyword is displayed on the screen in the display window 32 (step S509).

FIG. 13 is a diagram showing an example of keyword displayed in the display window. In the display window 32, two keywords "失礼" (shitsurei) which means "excuse me" and "至急" (shikyu) which means "emergency" are displayed as the result of selecting the first letter "し" (shi). The CPU monitors the states of the up and down cursor keys $19_U$ and $19_D$ (step S510), the set button 22 (step S511), and other buttons (step S512). When the up or down key $19_U$ or $19_D$ is pressed (step S510; Y), a keyword preceding or succeeding to the present one is read out (step S513). The readout keyword is displayed (step S514). Then, the CPU returns to step S510.

When the set button 22 is pressed (step S511), a keyword pointed by a cursor 74 (FIG. 13) is specified as a keyword for retrieval (step S515). The CPU advances to step S402 (FIG. 7) where the keyword retrieval starts.

When another button is pressed (step S512; N), the function associated with the pressed button is executed (step S516).

With provision of the word bank function, the data processing device 31 of the first embodiment replaces the underlined word in the phrase being displayed with another word, and translates the phrase into the phrase in another language, e.g., English.

FIGS. 14(a) to 14(d) are diagrams useful in explaining the word bank functions.

A normal phrase, which contains an underlined word designated by reference numeral 81, is first displayed in the display window 32 as shown in FIG. 14(a). The underlined word 81 may be replaced with another word, which is selected from among the words previously selected and stored.

In this instance of the embodiment, the phrase "毛布が欲しいのですが" (môfu ga hoshiinodesuga) which means "I'd like a blanket" is displayed, and the word "毛布" (môfu) which means "blanket" is underlined. Accordingly, the word "毛布" (môfu) may be replaced with another word.

In this display state, if the word bank button 17 is pressed, replaceable words are listed up on the screen of the display window 32, as shown in FIG. 14(b). The operator sets a cursor 82 at his desired word. In this instance, he points to the word "枕" (makura) which means "pillow". Accordingly, the "毛布" (môfu) is replaced with the "枕" (makura), as shown in FIG. 14(c). Then, if the Japanese-English button 24 is pressed, an English phrase "I'd like a pillow.", which is the translation of the Japanese phrase of FIG. 14(c), appears on the screen in the display window 32, as shown in FIG. FIG. 14(d). If the voice button 25 is pressed, the speaker 33 speaks the phrase in English, "I'd like a pillow".

Figure 15:
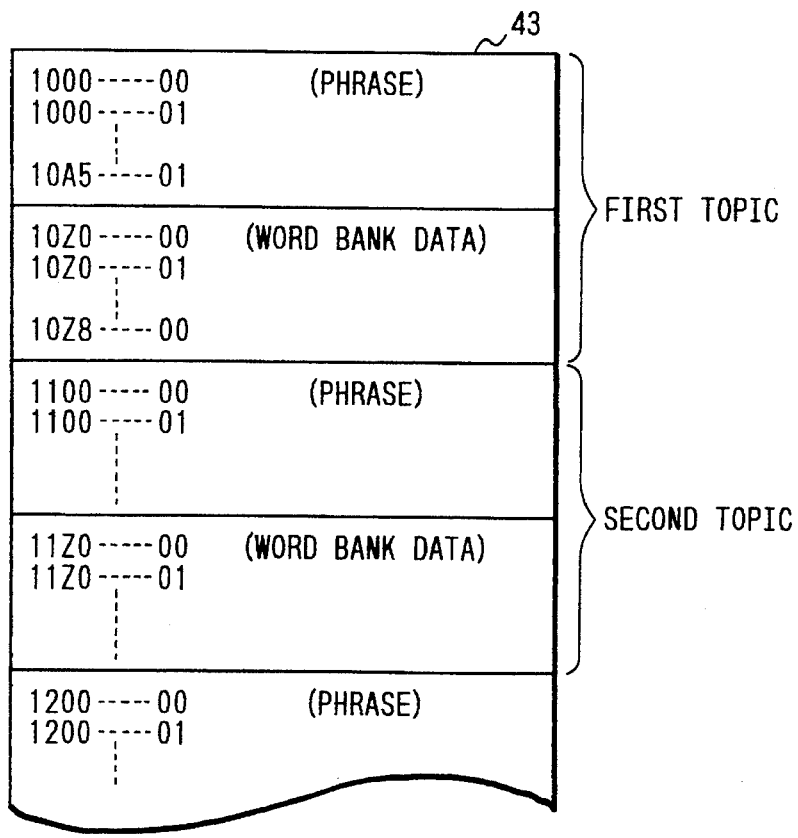
FIG. 15 is a diagram showing data storage locations in the ROM shown in FIG. 1.

FIG. 15 is a diagram showing data storage locations in the ROM 43 shown in FIG. 1. As shown, the ROM 43 stores the combinations of the phrase and its word bank data of the topics. To be more specific, the phrases of the first topic are stored in the memory area ranging from the address "1000 . . . 00" to the address "10A5 . . . 01". The word bank data used in this topic are stored in the memory area from the address "10Z0 . . . 00" to the address "10Z8 . . . 00". If the topic of the phrase shown in FIGS. 14(a) to 14(d) relates to a ship, the word bank data contains pillow, sheet, binoculars, sun oil, and the like.

The size of the memory area occupied by the topics in the ROM 43 is not fixed. Further, the number of phrases and the number of pieces of word bank data are variably used for the topics. In this embodiment, addresses are set so as to delineate the memory areas of the topics.

As shown, in the same topic, the combination of codes forming the phrase at the most significant digit and the next significant digit is the same as that for forming the word bank data. With use of such codes, the memory areas of the topics can be distinguished from one another.

In each memory area for storing the word bank data, the code at the third place as counted from the most significant digit is Z.

In the memory area for storing the phrases, other codes than the Z are used, and are incremented by 1 starting from zero in an ascending manner. In this example, only one character "Z" is used at the third place of the address code on the assumption that the number of pieces of word bank data is small relative to the number of phrases. If the ratio of the word bank data to the phrases is large, an increased number of characters may be used, such as X, Y, and Z.

Figure 16:
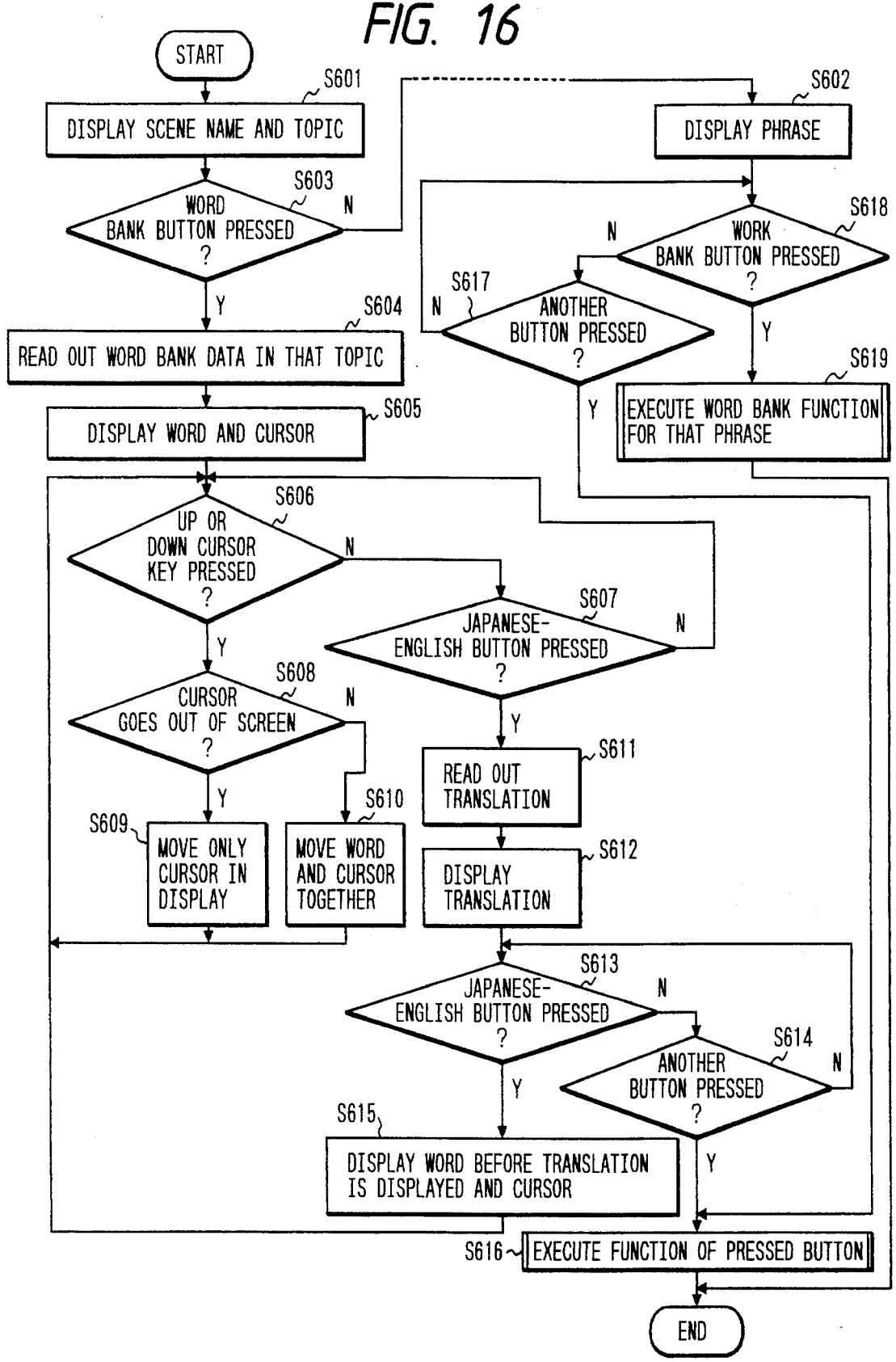
FIG. 16 is a flowchart showing the control flow mainly for a dictionary function as one of the word bank functions.

FIG. 16 is a flowchart showing the control flow mainly for a dictionary function as one of the word bank functions.

The word bank button 17 functions either a state that the name of scene and the topic are displayed in the display window 32 (step S601) or a state that a specific phrase is displayed as shown in FIG. 14(a) (step S602). The former state is charted in detail in FIG. 16.

In a state that the name of scene and the topic are displayed in the display window 32 (step S601), if the word bank button 17 is pressed (step S603; Y), the word bank data of the topic is read out of the ROM 43 as described with reference to FIG. 15 (step S604). The readout contents are converted into a character pattern by the character generator 45, and are displayed in the display window 32 (step S605). At this time, the cursor 82 is added to the first word, as shown in FIG. 14(b). The limited display area can display only two words.

At this time, the CPU 41 monitors the states of the up and down cursor keys $19_U$ or $19_D$, and the Japanese-English key 24 (steps S606 and S607). When the up or down cursor key 19$_U$ or 19$_D$ is depressed (step S606; Y), the CPU checks if the cursor 82 goes out of the screen of the display window 32 (step S608). To be more specific, in a state that the cursor 82 points to the word "枕" (makura) as shown in FIG. 14(b), if the down cursor key 19$_D$ is pressed, the cursor 82 stays within the screen. In this case, only the cursor is moved in the display of the words being left unchanged (step S609).

In a state that the cursor 82 points to "シーツ" (shîtsu), if the down cursor key 19$_D$ is pressed, it is impossible that only the cursor 82 is moved while the display of the words is left unchanged. In this case (step S608; N), the word to be displayed and the cursor are moved together (step S610). At this time, "シーツ" (shîtsu) which means "sheet" and "双眼鏡" (sôgankyo) which means "binocle", for example, are displayed as words.

After a desired word is thus displayed, the operator presses the Japanese-English key 24 to know the translation of it. The CPU 41 detects the key operation (step S607; Y), and reads the translation of the word out of the ROM 43 (step S611). The data processing device 31 can display English phrases as well as Japanese phrases so as to make use of the word bank function. Although not referred to in connection with FIG. 15, the ROM 43 actually stores pairs of Japanese and English phrases, and pairs of Japanese and English word bank data in the memory locations of slightly modified addresses. Accordingly, the translation of a word can be readily read by merely adding a predetermined numerical value to or subtracting from the address of the word.

After the translated, English word is read out, the contents of the present display are temporarily retracted to the work memory 44, while a character pattern of the translation is stored in the display memory (not shown) of the display driver 47, and then is displayed on the screen of the display window 32 (step S612).

At this time, the CPU 41 monitors the states of the Japanese-English key 24 and other buttons (steps S613 and S614). When the word bank button 17 is depressed again (step S613; Y), the display contents, which was retracted to in the work memory 44, are transferred to the display driver 47, which then drives the display window 32 to display the old Japanese word and the cursor 82 (step S615). Thereafter, control returns to step S606, so that the device is ready for the check of the meaning of the next word by the operator. If required, the device may be designed such that after the Japanese-English key 24 is pressed again, control returns to step S604 or S605 to display the first word, the second word, and so on, without retracting the display contents to the work memory and displaying them again.

When another button is pressed in step S614 (Y), the function associated with the pressed button is executed as described above (step S616). Also when a button other than the word bank button 17 is pressed (step S617; Y), the function associated with it is executed (step S616). When the word bank button 17 is pressed (step S618; Y), the word bank function for the phrase is executed as will be described hereinafter (step S619).

Figure 17:
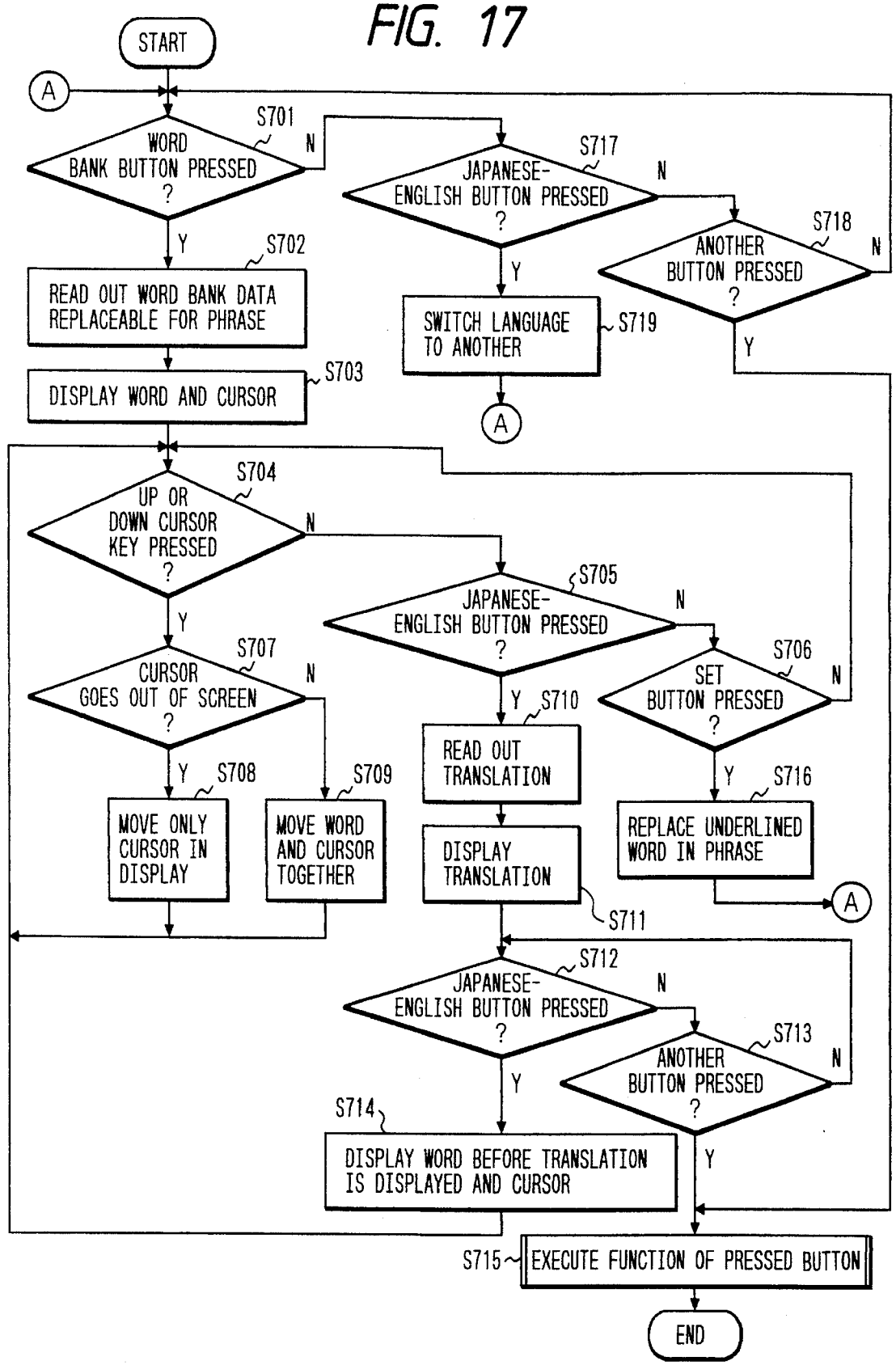
FIG. 17 is a flowchart showing the control flow when the word bank button is pressed in a state that a phrase is displayed.

FIG. 17 is a flowchart showing the control flow when the word bank button is pressed in a state that a phrase is displayed. When the word bank button is pressed in a state that a phrase is displayed (step S701; Y), the CPU reads word bank data which may be used in place of the phrase (step S702). The readout range of such word bank data is narrower than the range of the word bank range that is referred to in step S604 in FIG. 16. The readout range of the word bank data will be described in detail with reference to FIG. 18.

After the readout of the intended word bank data, those words and the cursor 82 are displayed in the display window 32 (step S703). In this state, the CPU 41 waits for the operation of any of the up and down cursor keys 19$_U$ and 19$_D$, the Japanese-English key 24, and the set button 22 (steps S704 to S706). When the up or down cursor key 19$_U$ or 19$_D$ is depressed, the movement/display control of the cursor 82 or the word associated therewith is performed (steps S707 to S709), as described referring to FIG. 16.

When the Japanese-English key 24 is pressed (step S705; Y), only the words at this point of time are displayed in the display window 32. Then, as described in connection with FIG. 16, the translation of the word marked with the cursor 82 is read out and displayed (steps S710 and S711). Thereafter, following the depression of the Japanese-English key 24 or a given button, the control as described in steps S613 to S616 is performed (steps S712 to S715).

When the set button 22 is pressed (step S706; Y), the underlined word in the phrase is replaced by the word indicated by the cursor 82 and displayed in the display window 32 (step S716). In a case where the word "毛布" (môfu) in the phrase "毛布が欲しいのですが" (môfu ga hoshiinodesuga) is replaced by the word "枕" (makura), the phrase "枕が欲しいのですが" (makura ga hoshiinodesuga) is displayed anew. Then, control returns to step S701.

When the word bank button 17 is not depressed in step S701, the CPU 41 monitors the states of the Japanese-English key 24 and another button to check if any of those is depressed. If another button is depressed (step S718; Y), the function associated with the depressed button is executed (step S715).

When the Japanese-English key 24 is depressed (step 717; Y), for example, the phrase "シーツが欲しいのですが" (shîtsu ga hoshiinodesuga) after replaced is converted into the English phrase "I'd like a sheet." and displayed in the display window 32 (step S719).

Figure 18:
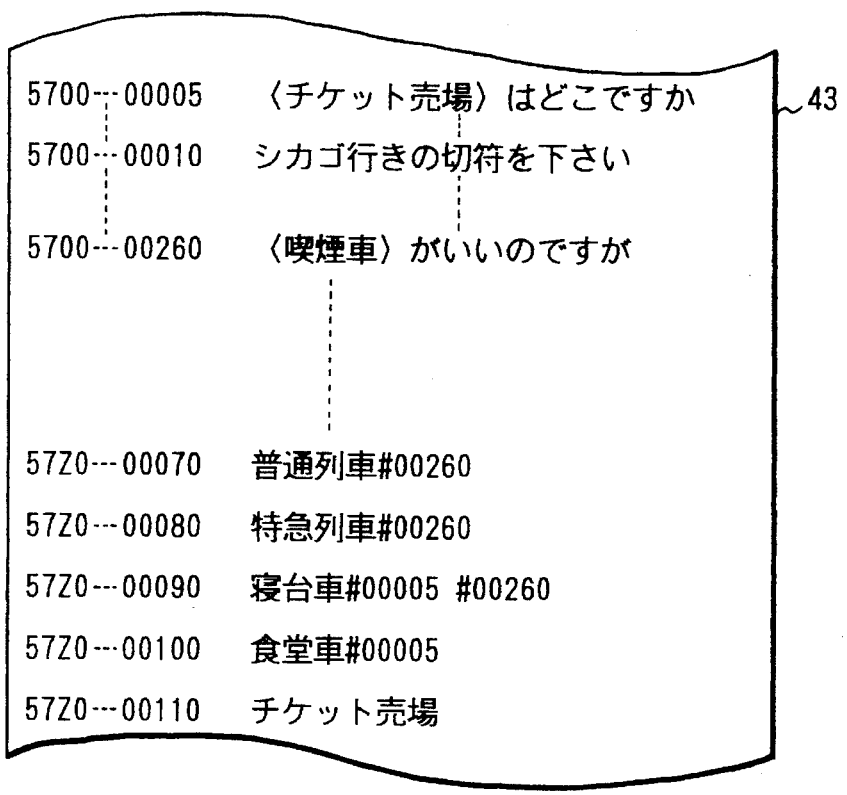
FIG. 18 is a diagram showing a part of the memory area of the ROM where underlined phrases and their corresponding word bank data are stored.

FIG. 18 is a diagram showing a part of the memory area of the ROM where underlined phrases and their corresponding word bank data are stored. In this instance of the embodiment, a word (or term) to be underlined is inserted between the inequality signs "<" and ">" . For example, the phrase "<チケット売場>はどこですか" (chiketto-uriba wa dokodesuka) is displayed in the form of "チケット売場はどこですか" which means "Where is the ticket office?".

As described in connection with FIG. 15, the address code of the word bank data contains the character "Z" at the third place as counted from the most significant digit. In reading the word bank data in step S604 of FIG. 16, the word bank data are all treated as objects to be read.

In step S702 of FIG. 17, only the word bank data, which may be used in a specific word of the phrase displayed in the display window 32, is read out. To realize this, a sing # is attached to the word bank data when it is required. The sign # is followed by the lower order address data of five digits. The lower order address data are coincident with those of the related phrases in the same topic. For example, the word "喫煙車" (kitsuen-sha) in the phrase of the address "5700 . . . 00260" may be replaced with another word containing the same lower order address data as that of the word "喫煙車" (kitsuen-sha) which means "smoking car". In this instance, the words containing the same lower order address data are "普通列車" (futsû-ressha) which means "local train" at the address "57Z0 ... 00070", "特急列車" (tokkyu-ressha) which means "special express train" at the address "57Z0 ... 00080", and "寝台車" (shindai-sha) which means "sleeping car" at the address "57Z0 ... 00090".

The word bank data at the address "57Z0 ... 00090" includes two signs # and #. The word bank data may also be used in place of the term "チケット売場" (chiketto-uriba) in the phrase at the address "5700 ... 00005".

Figure 19:
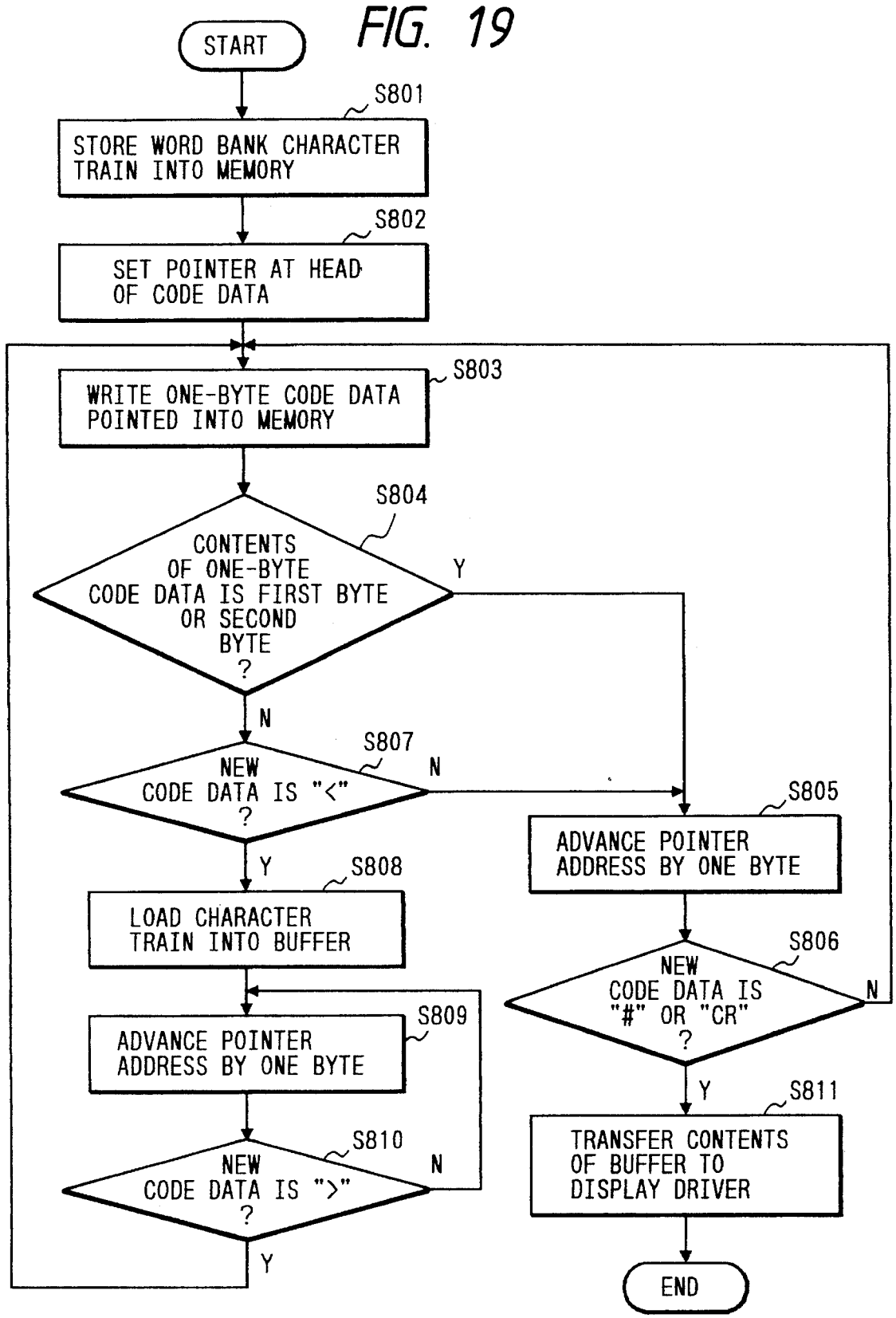
FIG. 19 is a flowchart showing the word replacing operation in a state that a phrase is displayed.

FIG. 19 is a flowchart showing the word replacing operation in a state that a phrase is displayed.

The CPU 41 stores a train of characters of a word (by which the present word is to be replaced), which is selected by the set button 22 (step S706 in FIG. 17) into a predetermined memory area of the work memory 44 (step S801). Then, it sets a read pointer at the head of the code data of the phrase, which is displayed when the word bank data is read out (step S802).

At this time, the CPU 41 writes the code data of one byte pointed by the read pointer into a predetermined memory area (buffer) of the work memory 44 (step S803). The CPU checks whether the contents of the code data is the first byte or the second byte of Kanji or Chinese character. If the answer is yes (Y), the word to be replaced is not reached. Then, the read pointer is advanced by one byte (step S805). The CPU checks whether new code data pointed by the read pointer is the sign # indicating no further readout or the symbol "CR" indicating the carriage return (step S806). If the answer is no (N), control advances to step S803. The sequence of operation as mentioned above is repeated.

When the contents of the code data, which is read by the read pointer in step S804, is not the first byte or the second byte of Kanji (the answer is no (N)), the CPU checks if it corresponds to the sign "<" (step S807). If the answer is yes (Y), the head position of the word to be replaced is determined. Then, the CPU reads the character train of the word by which the present word is to be replaced, from the work memory 44 and writes it into the buffer (step S808).

Subsequently, the work to inhibit the word (not yet displaced) sandwiched by the inequality signs "<" and ">" from being written into the buffer is carried out. To this end, the pointer address is advanced by one byte of the code data (step S809). The CPU checks if its contents corresponds to the sign ">" (step S810). Only the pointer address is advanced till the code data corresponding to the sing ">" is read out (steps S809 and S810; N).

After the code data corresponding to the sing ">" is read out (step S 810; Y), the read pointer reads out the next data of one byte, and stores it into the buffer (step S803). The code data corresponds to the word subsequent to the replaced word. Subsequently, data write operation is continued till the sign "#" or "CR" is found. When either of the signs is found, all of the phrases after replacement are written into the buffer (step S806; Y). The contents in the buffer are transferred to the display driver 47 (step S811). The display window 32 visually presents the phrase in which the underline word is replaced with another word.

The data processing device of the first embodiment thus far described is designed so as to display all of the words and terms of the topic, which are objects to be replaced, if the word bank button 17 is pressed in a state that the topic name in a scene is displayed, even when the device is not in a mode for phrase replacement. In this respect, the data processing device 31 may also be used as a simple dictionary to search a word or words relating to the topic in question.

Figure 20:
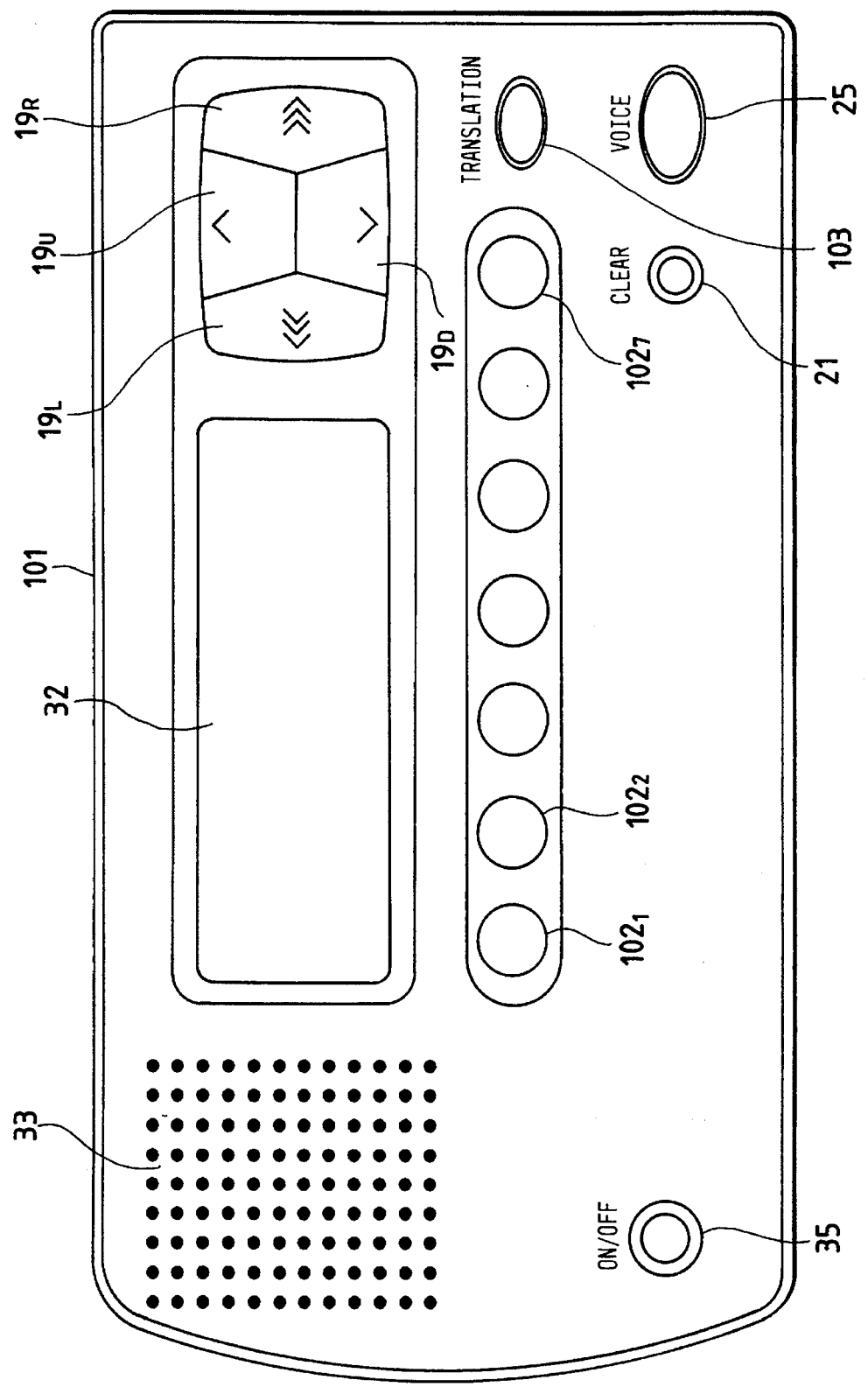
FIG. 20 is a plan view showing a data processing device according to a second embodiment of the present invention.

FIG. 20 is a plan view showing a data processing device according to a second embodiment of the present invention. In FIG. 20, like or equivalent portions are designated by like reference numerals in FIG. 2.

A data processing device 101, like the data processing device 31 of the first embodiment, is small and handy, and capable of handling six languages Japanese, English, French, German, Spanish, and Italian. Further, the data processing device is capable of displaying the phrases of these languages in a display window 32, and able to speak the phrases by a speaker 33.

In the data processing device 101, keys and button groups are laid out on the panel surface of the main body. A power switch 35 for turning on and off a power source, not shown, for supplying electric power to the device, is located under the speaker 33. The display window 32 is constructed with an LCD, in this embodiment. A group of cursor keys $19_U$, $19_D$, $19_R$ and $19_L$ are located on the right side of the display window 32. A group of scene buttons $102_1$ to $102_7$ are arrayed under the display window 32. Additionally, a translation button 103, a clear button 21, and a voice button 25 are arranged.

The hardware construction of the data processing device 101 is substantially the same as that of the data processing device 31 of the first embodiment. In the data processing device 101, the ROM 43 has a memory capacity large enough to handle six languages, and programs for converting the phrases and words among those languages. The layout of keys and buttons are simple and the number of them is reduced, thereby to provide an easy operation.

The seven scene buttons $102_1$ to $102_7$ are allotted to scenes in travels as shown in Table 2.

TABLE 2

| Button No. | Scene |
| --- | --- |
| 1 | Basic expression |
| 2 | Lodging |
| 3 | Eating out |
| 4 | Travel |
| 5 | Entertainment |
| 6 | Shopping |
| 7 | Emergency |

The data processing device 101 is capable of handling six languages. When an operator travels in a country, the conversion of one language to another language suffices for his travel. In the device, two languages, "basic language" and "target language" are designated in advance. The "basic language" means a language before converted, and the "target language" means a language after converted. In an initial state in which the language designation is not carried out, the "basic language" is Japanese, and the "target language" is English.

Figure 21:
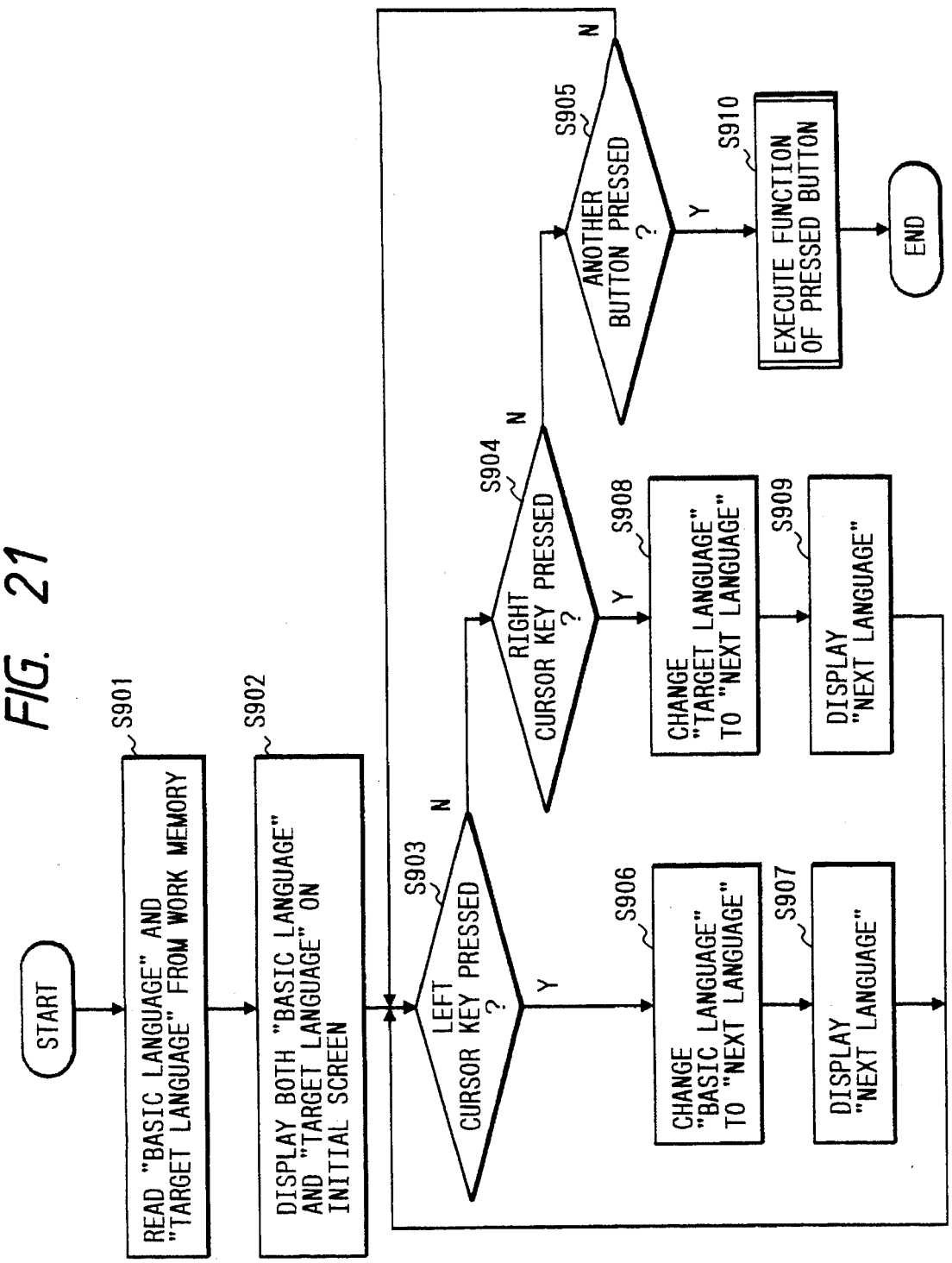
FIG. 21 is a flowchart showing the task to select a "basic language" or a "target language"

FIG. 21 is a flowchart showing the task to select a "basic language" or a "target language".

When the power switch 35 is turned on, the CPU 41 reads data indicative of "basic language" and "target language" from a nonvolatile memory area of the work memory 44 (step S901). The nonvolatile memory area is the RAM (random access memory) of the work memory 44 backed up by a battery. When the power switch 35 is turned off, the "basic language" and the "target language", which are lastly set, remains stored unless the backup battery is removed or terminated. The CPU 41 displays the "basic language", "target language", and other information on the screen of the display window 32 (step S902).

Figure 22:
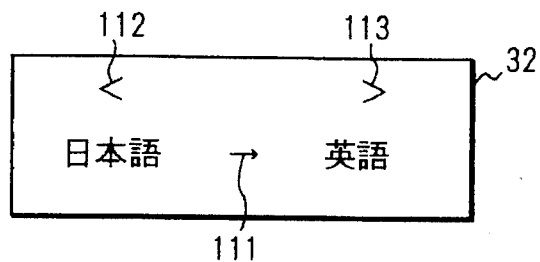
FIG. 22 is a diagram showing an initial screen in a display window.

FIG. 22 is a diagram showing an initial screen in the display window. On the screen in the display window 32, the "basic language" is displayed in the left area and the "target language" is displayed in the right area. An arrow 111 indicates the direction of language conversion. A sign "<" (left cursor) 112 for changing the "basic language" and a sign ">" (right cursor) 113 for changing the "target language" are displayed in the display areas.

Returning to FIG. 21, in a state that the "basic language", "target language", arrow 111, and right and left cursor keys 112 and 113 are displayed, the CPU 41 monitors the states of the right and left cursor keys $19_R$ and $19_L$ (FIG. 20), and other buttons to check if any of these keys and buttons is depressed (steps S903 to S905). When the left cursor key $19_L$ is depressed (step S903; Y), the CPU changes the "basic language" in the work memory 44 to the "next language" (step S906).

Where priority levels are assigned to the six languages, Japanese, English, French, German, Spanish, and Italian, in this order, the language succeeding to the "basic language" currently selected is the "next language". When Italian, for example, is currently selected as the "basic language", the "next language" is Japanese. In the data processing device 101, the "target language" currently selected is excluded from the objects to be selected for the "basic language". If required, it may be included. If it is included, when the data processing device is a Japanese→English mode, it can be easily be switched to an English→Japanese mode, although it suffers from a disadvantage that an invalid conversion from Japanese to Japanese possibly occurs.

After the "basic language" is thus selected, the kind of the "basic language" is displayed in the basic language (step S907). Control returns to step S903. Accordingly, an operator can set the "basic language" to a desired language by operating the left cursor key $19_L$ a preset number of times. In a state that a desired "basic language" is displayed, if the operator mistakenly operates the left cursor key $19_L$, he must carry out the select operation again the preset number of times.

The selection of the "target language" is carried out in a manner that the kind of the "target language" is changed to the "next language" (step S908) by operating the right cursor key $19_R$ (step S904; Y), and the "next language" is displayed in the display window 32. The procedure of the select task is substantially the same as that by using the left cursor key $19_L$.

After the "basic language" and the "target language" are correctly set, the operator selects the scene name and the topic. Then, any phrase is displayed in the display window 32.

Figure 23:
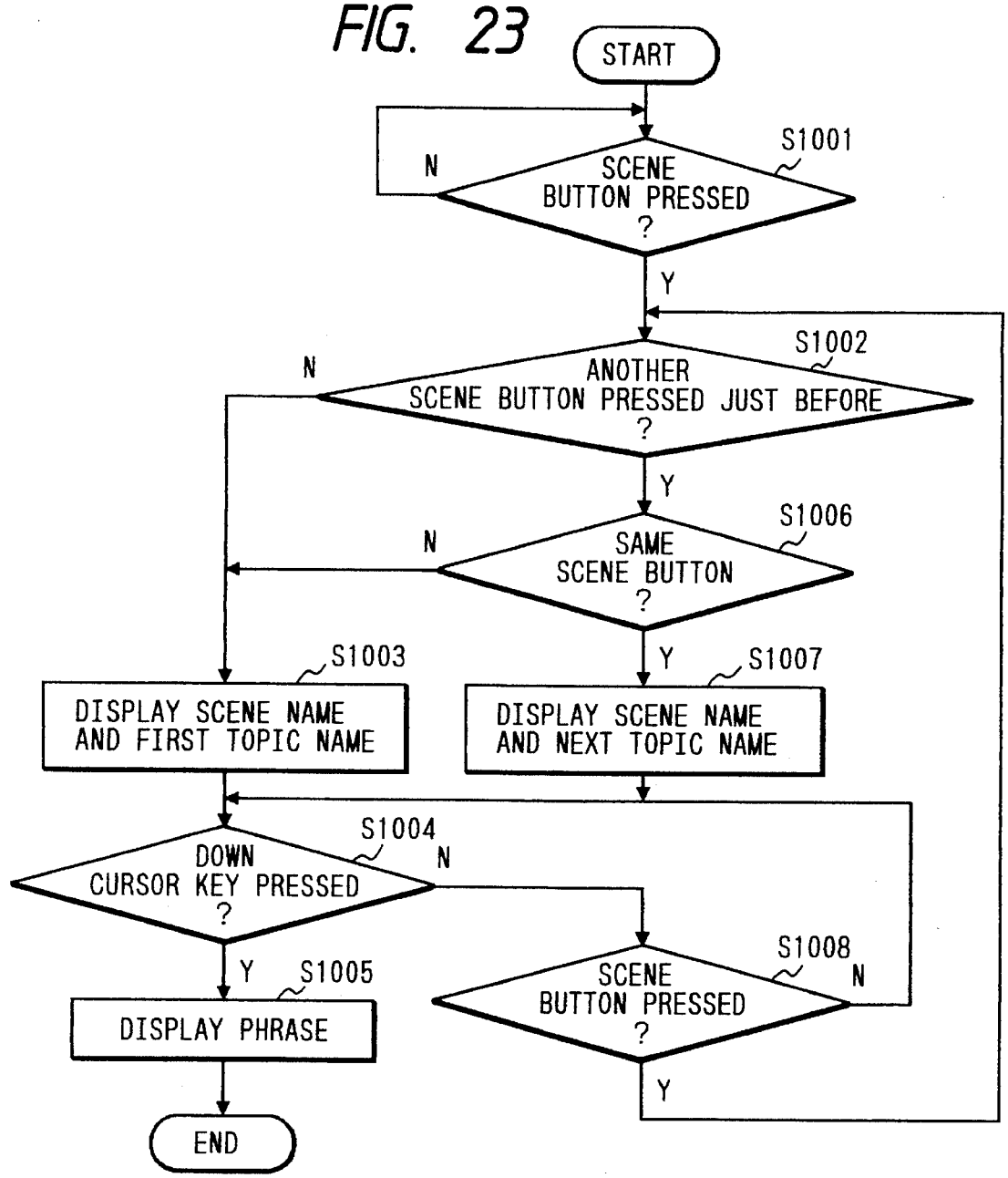
FIG. 23 is a flowchart showing the task to select the scene name and the topic name.

FIG. 23 is a flowchart showing the task to select the scene name and the topic name.

When any of the scene buttons $102_1$ to $102_7$ is pressed (step S1001; Y), the CPU 41 checks if any of the scene buttons $102_1$ to $102_7$ is selected just before it is operated (step S1002). When any of them is not operated or selected (N), the scene name and the first topic are displayed on the screen of the display window 32 (step S1003). When the operator presses the fourth scene button $102_4$, for example, the scene name "旅行" (ryokô) which means "travel" and the first topic "到着" (tôchaku) which means "arrival" are displayed.

In this state, the related phrase may be displayed (step S1005) by merely pressing the down cursor key $19_D$ (step S1004; Y).

When any of the scene buttons is operated in step S1002 (Y), the CPU checks which of the buttons is operated (step S1006). If the same button is depressed (Y), the currently displayed scene name and the topic next to the present topic are displayed on the screen of the display window 32 (step S1007). In this instance of the embodiment, "旅行" (ryokô) as the scene name and "到着" (tôchaku) as the topic are currently displayed. Then, "旅行" (ryokô) as the scene name and "車" (kuruma) which means "car" as the next topic are displayed.

In this way, the operator can select a desired topic by pressing the same scene button 102 in a successive manner. After the last topic is displayed by pressing the same scene button 102, the first topic is displayed again.

When a different scene button 102 is pressed in step S1006 (N), the CPU recognizes that the scene must be changed to another, and displays the scene name selected anew and the first topic of the scene in the display window 32 (step S1003). In a state that the scene name and the topic are displayed, if the down cursor key $19_D$ is pressed, control goes to step S1005. When any of scene buttons 102 is pressed (step S1008; Y), control goes back to step S1002, and repeats the similar procedural operation.

Figure 24:
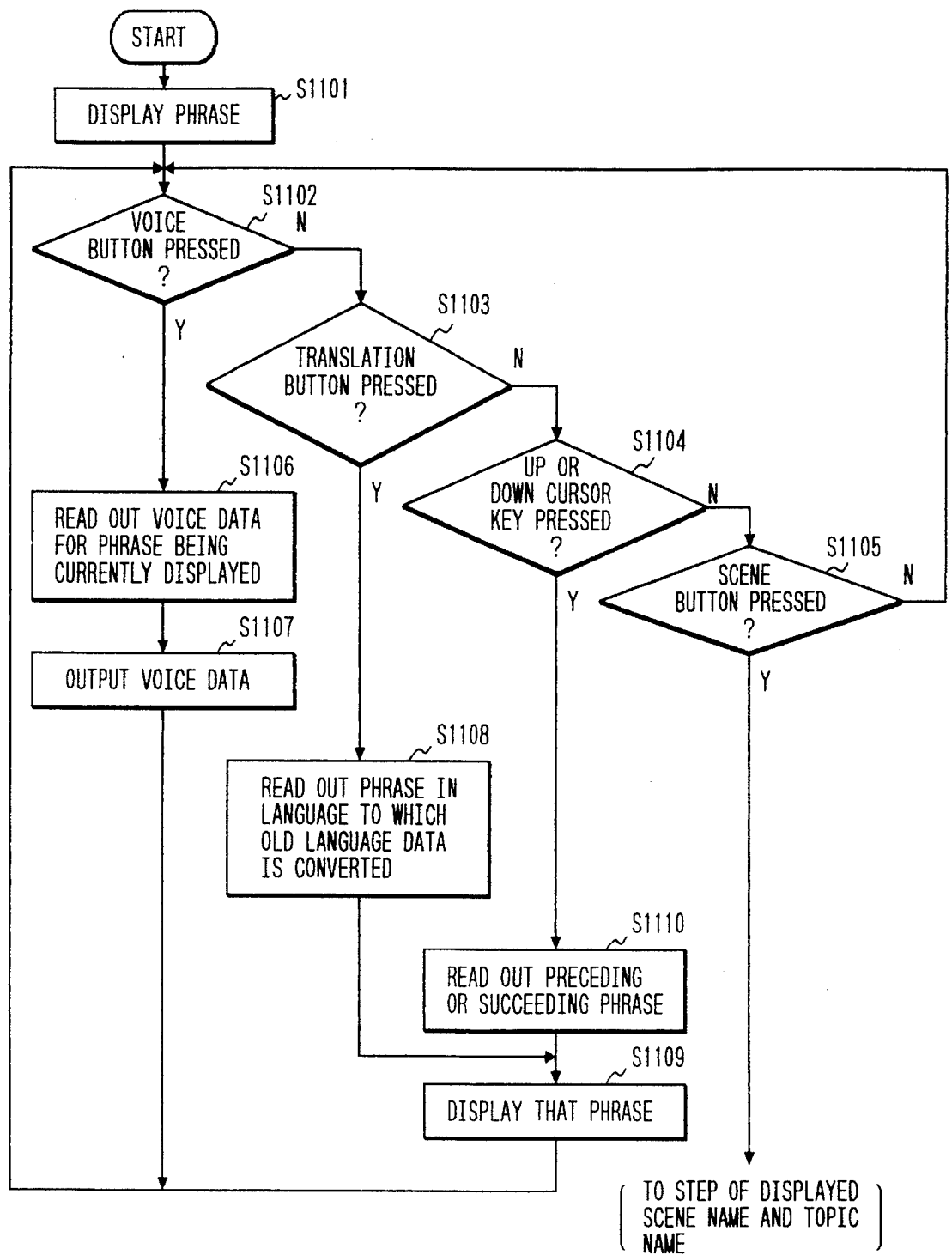
FIG. 24 is a flowchart showing the control flow when a phrase is displayed.
Figure 25:
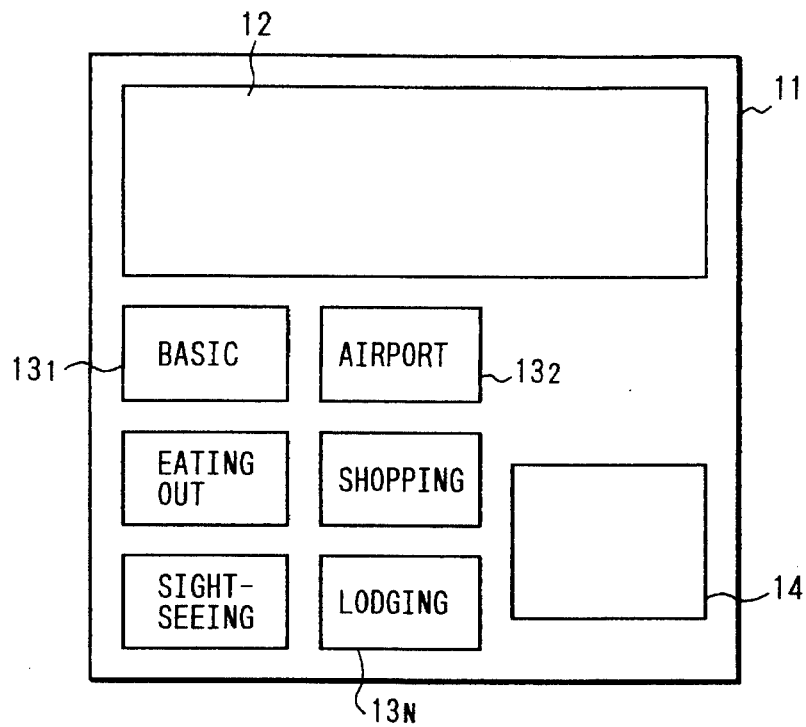
FIG. 25 is a plan view showing a conventional data processing device.
Figure 26:
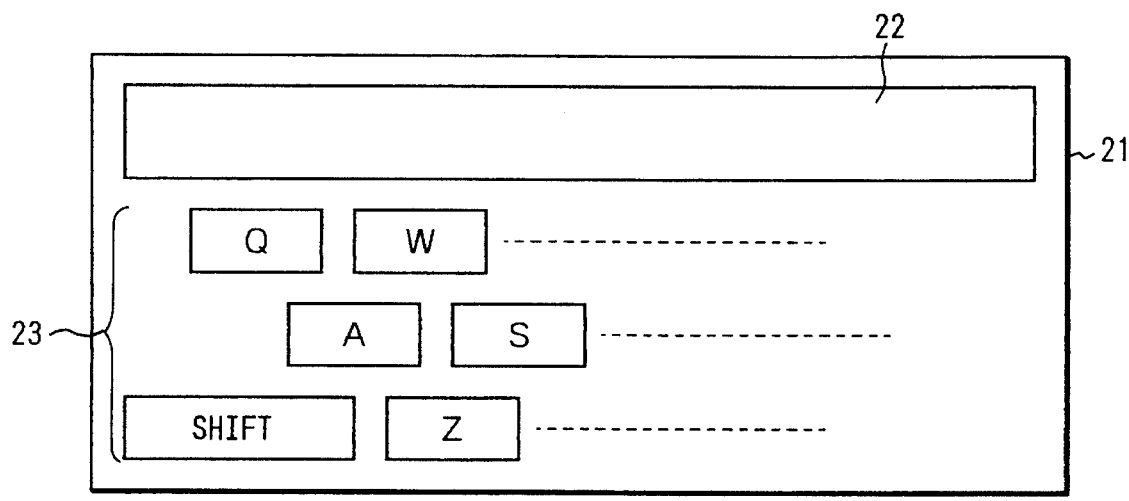
FIG. 26 is a plan view showing another conventional data processing device.

FIG. 24 is a flowchart showing the control flow when a phrase is displayed.

After a phrase is displayed through the procedural operation of FIG. 23 (step S1101), the CPU 41 monitors the states of the voice button 25, translation button 103, cursor keys 19, and scene buttons 102 to check if any of them is depressed (steps S1102 to S1105). When the voice button 25 is pressed, the CPU adds a preset numerical value to the address of the phrase currently displayed, thereby to read voice data for the phrase from the ROM 43 (step S1106). The voice data is transferred to the speech IC 46, which then drives the speaker 33 to generate the phrase utterly (step S1107).

Thereafter, the CPU 41 waits for the next button operation (steps S1102 to S1105). When the voice button 25 is repeatedly operated, the same phrase is uttered repeatedly.

When the translation button 103 is pressed (step S1103; Y), the CPU checks whether the currently displayed phrase is "basic language" or "target language", and adds a preset value to or subtract it from the address of the present phrase. Then, it reads the data of the phrase of the modified address from the ROM 43 (step S1108), and displays the phrase in the display window 32 (step S1109). Thereafter, the CPU 41 waits for the next button operation (steps S1102 to S1105).

In this state, if the operator presses the voice button 25 (step S1102; Y), the phrase is utterly output in the language converted and currently displayed. After the translation button 103 is pressed, if the voice button 25 is pressed, the phrase before converted is displayed and the voice of that phrase is output.

In a state that the phrase is displayed (steps S1101 and S1109), if the up or down cursor key 19 is pressed (step S1104; Y), e.g., it is the up cursor key $19_U$, the previous phrase is read out (step S1110) and displayed (step S1109). When the down cursor key $19_D$ is pressed, the next phrase is read out (step S1110) and displayed (step S1109).

In the state of the phrase being displayed (steps S1101 and S1109), if any of the scene buttons 102 is operated (step S1105; Y), the operation of simultaneously displaying the scene name and topic starts.

In the embodiment described above, the phrases having label data attached thereto are stored into the ROM 43. A desired phrase is retrieved depending on whether or not the retrieval word is coincident with the label data attached to the phrase. Alternatively, a conversion table for converting retrieval words to label data may be used. To retrieve a desired phrase, an operator enters a retrieval word into the data processing device. The retrieval table converts the retrieval word to corresponding label data. With the label data, the phrase is read out of the ROM 43 on the label data coincidence basis.

In the first embodiment, after a Japanese phrase is converted into an English phrase, the speaker articulates the English phrase with the voice. Alternatively, when a Japanese phrase is displayed, the speaker articulates corresponding English phrase with the voice after a related instruction is entered. In the alternative, after the address of the Japanese phrase is converted into the address of the English phrase, the voice corresponding to the address of the English phrase is read out. Further, the two procedural steps for the address conversion may be reduced to one procedural step if the sum of the address values or difference between the address values is added to the address value of the present phrase.

The ROM 43 for storing phrases and the like may be substituted by a hard disk or other suitable storage means. Six ROMs for storing six languages may be used, which are selectively connected to the data processing device by means of a proper select means.

In the embodiment, the words or terms that can be replaced are marked with underline. The underline may be replaced with any other marking means, such as black/white inversion or thick or thin characters. To produce the voice of the phrases containing the converted words or terms, the voice data of the phrases may be previously provided. Alternatively, the voice data of the replaced words/terms are previously provided. When the phrase containing the replaced word/term is output from the speaker, the voice data of the replaced word/term is used.

In the embodiments mentioned above, when the word/term is replaced, only the replaced word/term is displayed. In some case, when it is replaced, other parts than the replaced word/term must be changed. In English phrases, in replacing the word with another, the article associated with it must be frequently changed, viz., an article "a" is changed to "an" and vice versa. In this case, data to indicate the part to be changed is added to the data of the replaced word/term.

While in the embodiments, the replaceable words/terms are previously set in the data processing device, the device may be modified so that an operator enters his desired words/terms into the device. If so designed, the word/term conversion capability of the device is improved.

Also in the embodiments, keywords are previously picked up using the label data attached to the phrases, and stored into the ROM 43. To apply the data processing device of the invention to a data processor of the type in which data base is contained in a RAM or a hard disc, and the number of phrases to be retrieved is increased or decreased, the label data are picked up from the phrases and a list of the label data is prepared. If so designed, an operator can gain a desired keyword quickly.

As seen from the foregoing description, in the first construction of the present invention, phrases each including one or more words are stored in the phrase storing means in a state that label data relating to the phrase is attached to the phrase. A phrase with the same label data as the retrieval word, is retrieved from among those phrases in the phrase storing means. The retrieved phrase is displayed by the display.

Therefore, the retrieval word per se is the label data, so that the phrase retrieved by the retrieval word surely exists. With use of the label data, the phrase retrieval can be carried out without taking into consideration the inflection, and is easy when comparing with the retrieval method to directly retrieve the phrase. When the label data is attached to a phrase, the label data relates to the phrase. Accordingly, the data processing device can be designed so that an operator can reliably retrieve his desired phrases. Additionally, in this construction in which the label data is attached to the phrase, short label data can be assigned to a long phrase. This contributes to reduction of the retrieving time.

In the second construction of the present invention, phrases each including one or more words are stored in the phrase storing means in a state that label data relating to the phrase is attached to the phrase. The retrieval word entered from retrieval word input means is converted into corresponding label data. The phrase with the same label data as the converted label data is retrieved from among the phrases in the phrase storing means, and the retrieved phrase is displayed by the display. Accordingly, an operator may enter a retrieval word without any knowledge of the label data attached to the phrase. One retrieval word is not always assigned to one piece of label data. Accordingly, the operator enters possible retrieval word, and retrieves a phrase after the retrieval word is converted into label data. In this respect, even operators who are lack of label data knowledge can handle the data processing device of the invention. Further, in retrieving a phrase, the label data attached to the phrase is used. Accordingly, the phrase retrieval can be carried out without taking into consideration the inflection, and is easy when comparing with the retrieval method to directly retrieve the phrase.

In the third construction of the invention, phrases with marks attached to a specific part or parts are stored. When a phrase with a mark is displayed, the specific part is marked with an underline, for example. When a word/term by which the marked part of the phrase is to be replaced is selected, the phrase including the replaced word/term is converted into another phrase in another language. Accordingly, the phrases, which are larger in number than the phrases stored, can be displayed. This brings about memory saving and the reduction of the number of basic phrases displayed.

The fourth construction of the invention includes phrase converting means for converting a phrase displayed on the display screen into a corresponding phrase in another language, and phrase-voice storing means for storing the voice of phrases to be displayed. When a phrase is displayed, it is utterly output in a language to which the displayed phrase language is to be converted. In this case, the voice of the converted phrase is read out of the phrase-voice storing means. Accordingly, when a Japanese phrase is displayed, it can be utterly produced in English. This function is very useful for language learning stage, and also for business and travels.

The fifth construction of the invention includes phrase converting means for converting a phrase displayed on the display screen into a corresponding phrase in another language, and phrase-voice storing means for storing the voice of phrases to be displayed. For the phrase being displayed, the voice of the displayed phrase is read out of the phrase-voice storing means in spite of the language conversion state of the phrase, converted or not yet converted. With this function, an operator can select his desired phrase in a dark place where it is difficult to read the displayed phrase. Further, in learning foreign languages, an operator can hear phrases in foreign languages through only button operations.

The sixth construction of the invention is applicable for such a device that phrases such as phrases with label data attached thereto are stored in the phrase storing means, and a phrase is retrieved on the basis of the label data. The device incorporating the sixth construction includes means for causing the display to display a list of the first letters, for example, "い, ろ, は, . . . " (Japanese) and "a, b, c, . . . " (English), first-letter select means for selecting one of the first letters, for example, "い", label-data listing means for reading the label data corresponding to the first letter selected by first-letter select means, from the label data storing means and for causing the display to display the readout label data, for example, "井戸 (ido), 田舎 (inaka), . . . ", and label data select means for selecting one of the label data displayed by the label-data listing means. The phrase retrieval is carried out using the selected label data. In the sixth construction of the invention, there is no need of inputting the word with label data by operating the key. Therefore, the retrieval operation is efficiently carried out by using a less number of key strokes.

In the present invention, the phrases and label data as well are stored in the memory. To retrieve a phrase, a pattern of the label data attached to the phrase is detected from the phrase, that is, the address is not generated.

Accordingly, when the label data, like the phrase, is stored in the phrase storing means, a desired number of label data can be set for one phrase without any interference with other phrases and independently of the contents of phrases.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A data processing device comprising:

phrase storing means for storing phrases in one language, each stored phrase including one or more words and a mark attached to a specific part of the phrase to indicate a marked phrase part;

display means;

first means for controlling said display means to display one of the phrases read out of said phrase storing means and the attached mark;

phrase parts display means for causing said display means to display a list of phrase parts as replacements for the marked phrase part;

means for selecting, from the list of the displayed phrase parts, one phrase part as a replacement for the marked phrase part;

replacement display means for causing said display means to display the one phrase including the replacement phrase part in place of the marked phrase part as an alternative phrase;

phrase converting means for converting the alternative phrase into a corresponding phrase in another language; and second means for causing said display means to display the corresponding phrase received from said phrase converting means.

* * * * *